(12) United States Patent
Achler

(10) Patent No.: US 11,783,566 B2
(45) Date of Patent: Oct. 10, 2023

(54) FEEDBACK SYSTEMS AND METHODS FOR RECOGNIZING PATTERNS

(76) Inventor: Tsvi Achler, Urbana, IL (US)

( * ) Notice: Subject to any disclaimer, the term of this patent is extended or adjusted under 35 U.S.C. 154(b) by 0 days.

(21) Appl. No.: 12/394,699

(22) Filed: Feb. 27, 2009

(65) Prior Publication Data

US 2009/0254502 A1    Oct. 8, 2009

Related U.S. Application Data

(60) Provisional application No. 61/031,982, filed on Feb. 27, 2008.

(51) Int. Cl.
| G06N 3/02 | (2006.01) |
| G06V 10/44 | (2022.01) |
| G06F 18/241 | (2023.01) |
| G06V 10/764 | (2022.01) |

(52) U.S. Cl.
CPC .......... *G06V 10/454* (2022.01); *G06F 18/241* (2023.01); *G06N 3/02* (2013.01); *G06V 10/764* (2022.01)

(58) Field of Classification Search
None
See application file for complete search history.

(56) References Cited

U.S. PATENT DOCUMENTS

| 5,040,214 | A |  | 8/1991 | Grossberg | |
| 5,142,590 | A |  | 8/1992 | Carpenter et al. | |
| 5,448,684 | A | * | 9/1995 | Holt | 706/20 |
| 5,687,286 | A |  | 11/1997 | Bar-Yam | |
| 6,601,049 | B1 | * | 7/2003 | Cooper | 706/15 |
| 7,321,882 | B2 | * | 1/2008 | Jaeger | 706/30 |
| 7,814,038 | B1 | * | 10/2010 | Repici | 706/25 |
| 2005/0100209 | A1 | * | 5/2005 | Lewis et al. | 382/159 |
| 2005/0114278 | A1 |  | 5/2005 | Saptharish et al. | |
| 2006/0089335 | A1 | * | 4/2006 | Liu et al. | 514/114 |
| 2006/0208169 | A1 | * | 9/2006 | Breed et al. | 250/221 |
| 2007/0194727 | A1 | * | 8/2007 | McKinstry et al. | 318/53 |
| 2008/0258767 | A1 | * | 10/2008 | Snider et al. | 326/46 |
| 2009/0254502 | A1 | * | 10/2009 | Achler | 706/16 |

OTHER PUBLICATIONS

Mao et al. "Dynamics of winner-take-all competition in recurrent neural networks with laternal inhibition", IEEE transactions on neural networks, 2007, pp. 55-69.*
Mitchell et al. "Shunting inhibition modulates neuronal gain during synapse excitation", Neuron, vol. 38, 2003, pp. 433-445.*
Ohta et al. "Recurrent neural network architecture with pre-synaptic inhibition for incremental learning", Elsevier, 2006, pp. 1106-1119.*
Achler, "Input shunt networks", Elsevier, 2002, pp. 249-255.*

(Continued)

*Primary Examiner* — Daniel T Pellett

(57) ABSTRACT

Pattern classification systems and methods are disclosed. The pattern classification systems and methods employ one or more classification networks that can parse multiple patterns simultaneously while providing a continuous feedback about its progress. Pre-synaptic inhibition is employed to inhibit feedback connections to permit more flexible processing. Various additional improvements result in highly robust pattern recognition systems and methods that are suitable for use in research, development, and production.

16 Claims, 26 Drawing Sheets

(56) References Cited

OTHER PUBLICATIONS

Seung in "Pattern analysis and synthesis in attractor neural networks" In K.Y, M. Wong, I. King, and D.Y. Yeung editors Theoretical Aspects of Neural Computation A Multidisciplinary Perspective Singapore Springer Verlag.*
Arulampalam "Expanding the structure of shunting inhibitory artificial Neural Network Classifiers" Proc. 7th Australian and New Zealand Intelligent Information Systems Conf. (ANZIIS',01), pp. 89-94 2001.*
Reese, Martin G. "Application of a time-delay neural network to promoter annotation in the *Drosophila melanogaster* genome." Computers & chemistry 26.1 (2001): 51-56.*
"International Search Report", Issued in PCT Application No. PCT/US2009/035496; dated Oct. 21, 2009.
"Written Opinion", Issued in PCT Application No. PCT/US2009/035496; dated Oct. 21, 2009.
"International Preliminary Report on Patentability", Issued in PCT Application No. PCT/US2009/035496; dated Sep. 10, 2010.
Achler, Tsvi "Input Shunt Networks", Elsevier Science B.V., Neurocomputing 44, Year 2002, pp. 249-255.
Achler, Tsvi "Object Classification with Recurrent Feedback Neural Networks", Proc. SPIE Evolutionary and Bio-inspired Computation: Theory and Applications, vol. 6563, 12 pages, 2007.
Achler, et al., "Input Feedback Networks: Classification and Inference Based on Network Structure", Artificial General Intelligence 1: 15-26.
Achler, et al., "Hybrid Classification and Symbolic-Like Manipulation Using Self-Regulatory Feedback Networks", Proceedings of the Fourth International Workshop on Neural-Symbolic Learning and Reasoning, 2008, 4 pages.
Achler, et al., "Shedding Weights: More With Less", Proceedings of the 2008 IEEE International Joint Conference on Neural Networks (IJCNN'08), 8 pages.
Albert, et al., "Error and Attack Tolerance of Complex Networks", Macmillan Magazines Ltd, Letters to Nature, vol. 406, Jul. 27, 2000, pp. 378-382.
Bichot, et al., "Parallel and Serial Neural Mechanisms for Visual Search in Macaque Area V4", www.sciencemag.org, Science, vol. 308, Apr. 22, 2005, pp. 529-534.
Carpenter, et al., "A Massively Parallel Architecture for a Self-Organizing Neural Pattern-Recognition Machine", Academic Press, Inc., Computer Vision Graphics and Image Processing, vol. 37(1), 1987, pp. 54-115.
Chelazzi, et al., "Responses of Neurons in Inferior Temporal Cortex During Memory-Guided Visual Search", The American Physiological Society, J Neurophysiol, vol. 80(6), 1998, pp. 2918-2940.
Cudmore, et al., "Long-Term Potentiation of Intrinsic Excitability in LV Visual CorticalN", The American Physiological Society, J Neurophysiol, vol. 92(1), 2004, pp. 341-348.
Desimone, et al., "Neural Mechanisms of Selective Visual Attention", www.annualreviews.org/aronline, Annual Reviews Neurosci, vol. 18, 1995, pp. 193-222.
Duncan, et al., "Visual-Search and Stimulus Similarity", Psychological Review, vol. 96(3), Jul. 1, 1989, pp. 433-458.
Froemke, et al., "Contribution of Individual Spikes in Burst-Induced Long-Term Synaptic Modification", J Neurophysiol, vol. 95(3), 2006, pp. 1620-1629.
Grill-Spector, et al., "Repetition and the Brain: Neural Models of Stimulus-Specific Effects", www.sciencedirect.com, Trends Cogn Sci, vol. 10(1), 2005, pp. 14-23.
Kauffman, et al., "Random Boolean Network Models and the Yeast Transcriptional Network", Proc National Academy Science USA, vol. 100(25), Dec. 9, 2003, pp. 14796-14799.
Luck, et al., "Neural Mechanisms of Spatial Selective Attention in Areas V1, V2, and V4 of Macaque Visual Cortex", The American Physiological Society, J Neurophysiol, vol. 77(1), 1997, pp. 24-42.
Maunsell, et al., "Feature-Based Attention in Visual Cortex", www.sciencedirect.com, Elsevier Ltd., Trends Neuroscience, vol. 29(6), 2006, pp. 317-322.
Milo, et al., "Network Motifs: Simple Building Blocks of Complex Networks", ww.sciencemag.org, Science, vol. 298(5594), Oct. 25, 2002, pp. 824-827.
Nochomovitz, et al., "Highly Designable-Phenotypes and Mutational Buffers Emerge from a Systematic Mapping Between Network Topology and Dynamic Output", Proc National Academy Science USA, vol. 103(11), Mar. 14, 2006, pp. 4180-4185.
Nykter, et al., "Critical Networks Exhibit Maximal Information Diversity in Structure-Dynamics Relationships", The American Physical Society, Phys Rev Lett, vol. 100(5), 2008, 4 Pages Total.
Rao, et al., "Unsupervised Segmentation with Dynamical Units", IEEE Transactions on Neural Networks, vol. 19(1), Jan. 2008 pp. 168-182.
Reynolds, et al., "The Role of Neural Mechanisms of Attention in Solving the Binding Problem", Neuron, vol. 24(1), Sep. 1999, pp. 19-29.
Shmulevich, et al., "The Role of Certain Post Classes in Boolean Network Models of Genetic Networks", Proc National Academy Science USA, vol. 100(19), Sep. 16, 2003, pp. 10734-10739.
Spratling, et al., "A Feedback Model of Visual Attention", Journal of Cognitive Neuroscience, vol. 16(2), 2004, pp. 219-237.
Treisman, et al., "Feature Analysis in Early Vision—Evidence from Search Asymmetries", The American Psychological Association, Inc., Psychological Review, vol. 95(1), 1988, pp. 15-48.
Treue, et al., "Feature-Based Attention Influences Motion Processing Gain in Macaque Visual Cortex", Macmillan Magazines Ltd, Nature, vol. 399(6736), Jun. 10, 1999, pp. 575-579.
Usher, et al., "Modeling the Temporal Dynamics of IT Neurons in Visual Search: A Mechanism for Top-Down Selective Attention", Massachusetts Institute of Technology, Journal of Cognitive Neuroscience, vol. 8(4), 1996, pp. 311-327.
Von Der Malsburg, Christoph, "The What and Why of Binding: The Modeler's Perspective", Cell Press, Neuron, vol. 24(1), Sep. 1999, pp. 95-104, 111-125.
Wolfe, Jeremy, "Asymmetries in Visual Search: An introduction", Psychonomic Society, Inc., Perception & Psychophysics, vol. 63(3), 2001, pp. 381-389.

* cited by examiner

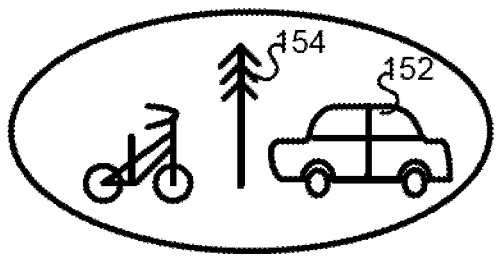
Fig. 1B
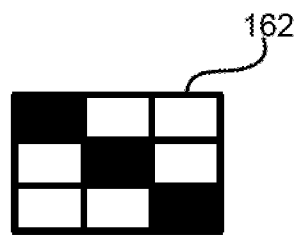
Fig. 1C
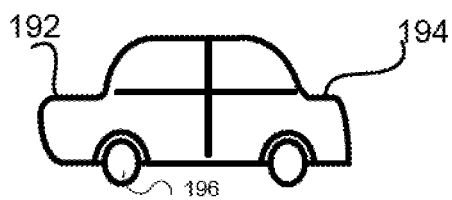
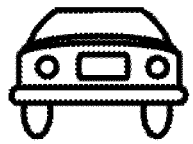
Fig. 1D    Fig. 1E    Fig. 1F
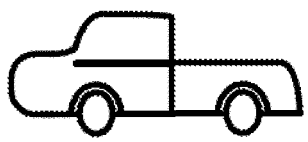
Fig. 1G    Fig. 1P    Fig. 1H

FEATURE EXTRACTOR PRESENTING SPACE-INVARIANT INFORMATION FROM VISUAL FIELD

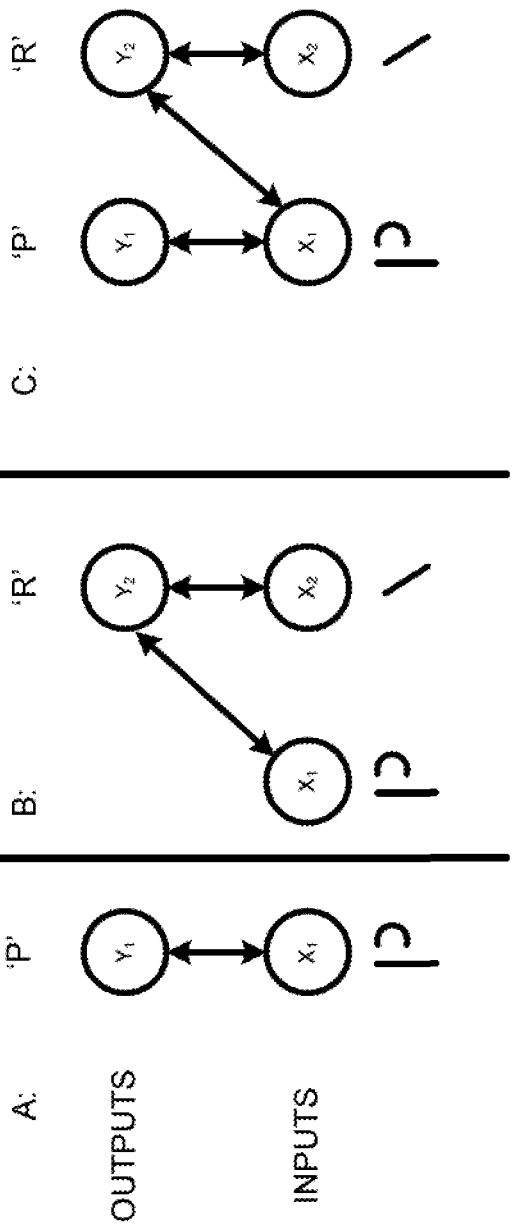
Fig. 28 (A-C)

FEEDBACK SYSTEMS AND METHODS FOR RECOGNIZING PATTERNS

PRIORITY CLAIM

The present invention claims priority under 35 USC 119(e) to a provisional application entitled "SYSTEMS AND METHODS FOR RECOGNIZING PATTERN" filed Feb. 27, 2008, Application No. 61/031,982, which is incorporated by reference herein.

BACKGROUND OF THE INVENTION

The invention is based on control through self regulatory processes. Such processes can perform recognition computations based on control. Thus the invention applies to both recognition systems and production processes.

Neural networks are a conceptual way to describe interactions between compartmentalized units involved in recognition. Interconnected 'neuron' cells used for generating responses to input patterns. In reviewing prior art, connections of neural networks can be described by one of three types: feed-forward, same level and feedback. These connect between a pre-processed 'input' layer, and a post processed (neuron) 'output' layer which reveals 'recognized' components. The relations are: feed forward (input to output), lateral—same level (output to output), and feedback (output to input). In prior art, the strength of feed-forward and sometimes lateral connections are determined as optimized parameters for the task the network is to perform.

Most forms of prior art involves selecting feed-forward connections whose optimized values contribute to pattern recognition. The optimization process for connections is called training. Recognition is determined by output values. Output values are determined during a test phase where inputs values are usually multiplied by the optimized feed-forward connection values and possibly modified by a nonlinear function. The invention performs both feed-forward and feedback processing during testing.

Another form of prior art involves lateral connections (connections between outputs 'on the same-level'). Lateral inhibition uses lateral connections that are inhibitory to inhibit simultaneously active outputs. Lateral inhibition arrangement forces the lesser-activated neurons to be inhibited by more activated neurons thus generating a more singular or specific response to an input pattern: competition. Lateral inhibition can give rise to competitive 'winner-take-all' behavior between cells. However, lateral competition and especially the winner-take-all paradigm does not allow simultaneous representations.

To address this problem, Adaptive Resonance Theory (ART), i.e. U.S. Pat. No. 5,142,1190 provides a mechanism to evaluate sequentially the best-fitting winner-take-all representations by evaluating how well the winning representation overlaps with the input pattern.

In ART each computational module performs the following steps: (1) Establish neural unit activation values through feed-forward connections. (2) Inhibit other neuron representations using lateral inhibition and winner-take-all. (3) Using feedback inhibit inputs that were used by winning neuron. (4) Determine vigilance: how well do they match? The vigilance criteria is generated by a subtraction of inputs and used inputs. (a) if vigilance is achieved, matches is close enough to neuron representation: consider the object to have been recognized. (b) Fails vigilance: either learn this object or reject it (step 5). (5) Reject: inhibit the cell that represents that template and go back to step 1.

One can think of this algorithm as performing steps in a cycle. The steps are: choosing a neuron cell, evaluating vigilance, and resetting a cell (inhibiting activation) if it fails to meet vigilance criteria. The cycle is repeated until either an acceptable match is found or all representations are exhausted.

Cycling of ART is not an efficient strategy for real-time analysis of images because images can appear, move, or change independently of the state of the cycles. If the cycling strategy is run asynchronously (in real time), signals may get mixed up and the system will not know if it checked evidence A simultaneously with evidence B. A good template fit may be ignored if an inappropriate amount of vigilance occurred in a previous instant and the template cell was driven to inhibition.

Thus with ART, each image change in focus has to be done before a cycle and the network has to wait for the completion of cycling through templates. This also requires that cells must be released from inhibition at some point so that the templates previously and unsuccessfully evaluated for a match can be evaluated for a new image.

This de-inhibition is not well defined in the ART theory and presumably does not occur until a new image is presented or if connected in a hierarchy vigilance from a higher level unit is activated. But in order to know when to cancel inhibition, the system needs to recognize when a new image arrived but this poses a problem because in order to recognize that a new image is present, the prior art has to identify the image enough to notice its change: to finish cycling.

In addition, this problem becomes even more troublesome in multiple layers of hierarchy of ART modules: each level of the hierarchy needs to release cells from inhibition when a higher-level module settles onto a new cell.

The invention represents an advancement to pattern classification by creating a classification network that can parse multiple patterns simultaneously while providing a continuous feedback about its progress. The invention uses Pre-synaptic inhibition defined as inhibitory feedback connections (output inhibits its own inputs). This is a counterintuitive configuration that allows more flexible processing. Using the classification network of the invention, a complete system is described which can search for objects in a scene and determine how well they are recognized.

BRIEF SUMMARY OF THE INVENTION

The invention relates, in an embodiment, to a computer-implemented method for performing pattern classification of objects. The method includes parsing one or more patterns simultaneously. The method also includes providing progress feedback while parsing.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 1B-1P show various views of various example objects to be recognized.

FIG. 28(A-C) shows how modular nodes y1 and y2 (A & B respectively) can be simply combined to form a combined network (C).

DESCRIPTION OF SOME EMBODIMENTS OF THE INVENTION

Figure 1A:
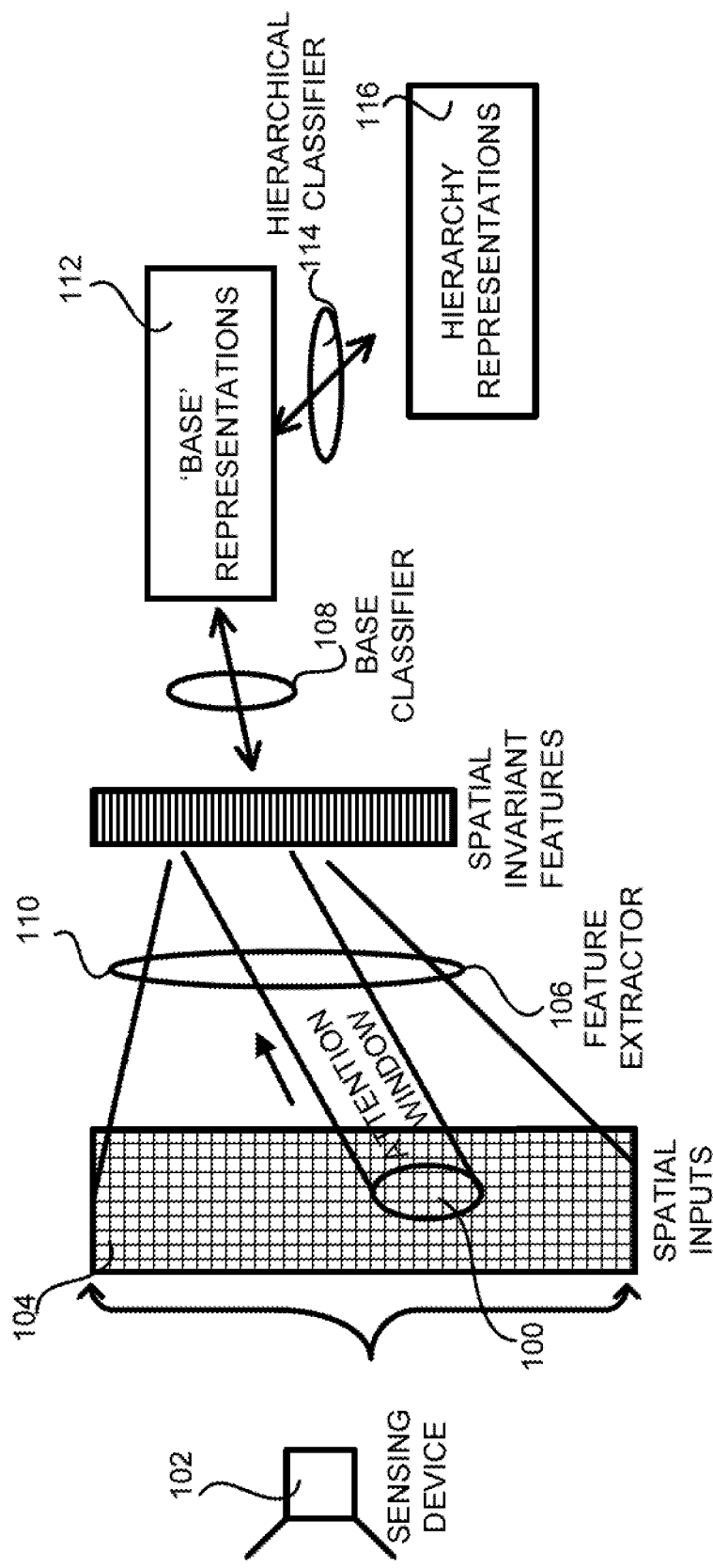
FIG. 1A show a high level diagram of a recognition system with regulatory feedback as its basis.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

Self regulatory processes can be found throughout nature. Physiological entities from cells to animals display exceptional homeostasis control (internal balance) even while their external (and internal) environment may change wildly. For example, they replace consumed proteins and avoid excess concentrations of protein products. Thus they recognize the proteins missing and select the best way replace them.

This homeostasis is maintained despite complex production networks with multiple production pathways and control points. The invention is a method to maintain homeostasis through self-inhibition.

In networks implementing the self inhibition invention, the overall network replaces products while producing the least amount of extraneous products.

With an appropriate self inhibition configuration, each production component only regulates its own products (is modular) and individual components can be simply added together to produce this network-wide homeostasis.

The invention can be applied to wherever simple regulated components can be combined to form complex production lines and their combined action can determine an efficient system-wide production configuration. This mechanism is applicable in biological applications such as chemical synthesis, i.e. producing hemoglobin, gene regulation, and operation engineering applications such as factory production lines.

Furthermore, similar methods (a homeostatic control of neuron activity) may be employed by computational algorithms to recognize and interpret the environment. In recognition systems the best fitting component that 'replaces' the input activity, is a recognized 'output' component.

Since recognition is commonly evaluated though neural network type computational mechanisms, the rest of this background will focus on performing pattern recognition and pattern classification through computational networks.

Challenges remain in developing recognition systems to recognize multiple simultaneous patterns. Most classifier algorithms function based on parameter optimization methods such as a hill climbing or convex optimization, which allows them to learn any arbitrary pattern. However, these algorithms are not optimal in recognizing novel combinations of previously learned patterns. To achieve reliable precision given novel combinations, they require an exponential amount of training. Unfortunately, realistic scenes are formed from combinations of previously learned patterns, which often overlap. Such scenarios include written words and numbers, scene understanding, and robot disambiguation of sensory information.

Optimized weights have an important role in algorithms' incongruent performance between single and novel combinations of patterns. Weight parameters are determined through the training data, requiring the training distribution to be similar to the testing distribution. This allows the correlation between input features and outcomes to be determined through a training set, and learning to occur. However the training distribution is commonly violated in the natural (test) environment, such as a scene or overlapping patterns.

If a network is trained on patterns A and B presented by themselves and they appear side-by-side simultaneously, this is outside the training distribution. Training for every pair of possible patterns (or triplets, quadruplets, etc.) is combinatorially impractical. This combinatorial explosion of training is responsible for the superposition catastrophe (Rachkovskij & Kussul 2001), and described in early connectionist networks (Rosenblatt 1962). The invention through self-regulatory control allows a more dynamic and efficient recognition and search that avoids a combinatorial problem.

Combinatorial problems are important when recognizing scenes and searching. For example, to be successful in a search for a pear within a basket of apples, the features shared with apple should not predominantly support either pear or apple. An orange within the basket will result in a different set of shared features that should not predominantly support either orange or apple. To perform this search, conventional state of the art methods require a-priori determination of which are the most relevant (and irrelevant) features. This requires networks to predict and be trained for each object combination that may occur within the basket (in a complex world this is combinatorially impractical). Two types of combinatorial explosions are possible: 1) too many connections required if representations connect to all others. Thus, given the number of possible pattern combinations in the world, theories may require an infinite number of connections. 2) An inability to process combinations of previously learned representations appearing simultaneously (superposition catastrophe).

Figure 27:
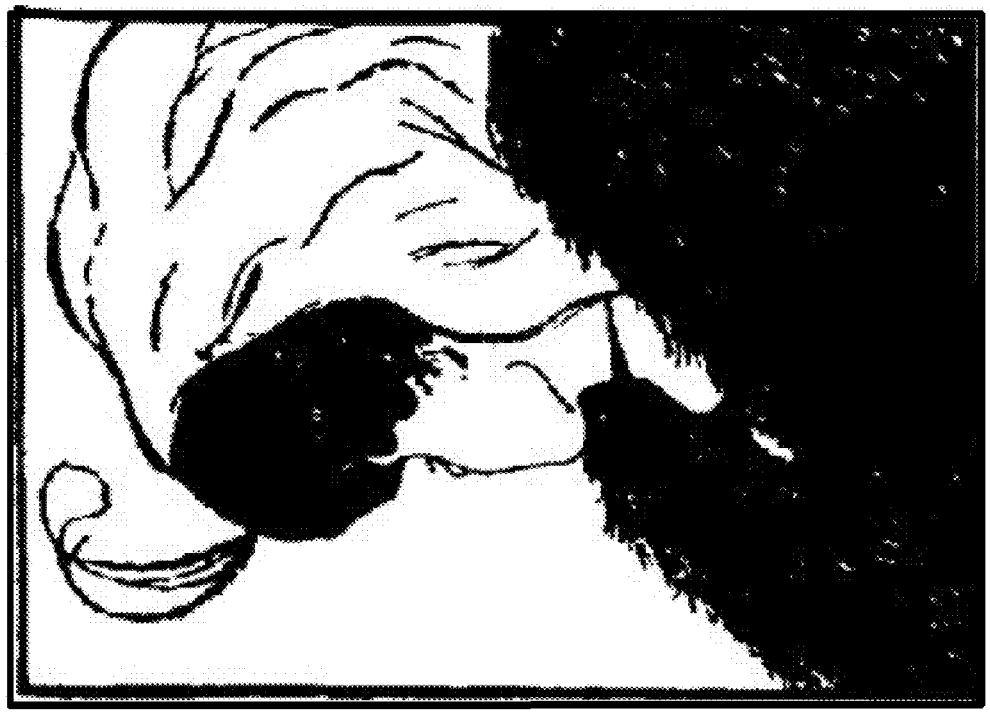
FIG. 27 shows the old woman/young woman illusion.

Another related combinatorial problem is 'the binding problem' when image features can be interpreted through more than one representation (von der Malsburg 1999; Rao, Cecchi et al. 2008). An intuitive way to describe this problem is through visual illusions. The same local pattern has different interpretations based on the overall interpretation of the picture. For example, in the old woman/young woman illusion (FIG. 27), the young woman's chin is the old woman's nose. Though the features are exactly the same, the interpretation is different. This picture forms an illusion because all features in the image can fit into two representations. However, classifiers have similar difficulties but with simpler patterns. If a pattern can be part of two representations then the networks must determine to which it belongs. This is not trivial because for novel combinations that include the part may require training to determine to where the part belongs. The number of scenarios possible (hence training) can grow exponentially.

Methods incorporating oscillatory dynamics e.g. (von der Malsburg 1999; Rao, Cecchi et al. 2008) have been proposed for differentiating components of patterns within a scene and partially addressing these problems, but do not directly contend with parameter optimization.

The invention is motivated by self inhibitory control found in neuroscience (through pre-synaptic inhibition) to dynamically adjust for co-occurring features without training. These dynamics and connectivity (each cell only required to connect to its inputs) circumvent combinatorial explosions.

FIG. 1A shows, visual recognition embodiments of the invention, a high level diagram of a recognition system with regulatory feedback as its basis. There is shown in FIG. 1A a sensing device (102), which may be any image capture device, such as a digital camera, providing spatial inputs in the form of pixels 104. During processing, selected pixels of pixels 104 can be selected for processing by attention window 100. The processing, among other tasks, ascertains the spatial invariant feature patterns as will be discussed below.

With respect to FIG. 1B, suppose FIG. 1B is a scene presented to sensing device 102 and captured as spatial inputs 104. Attention window 100 can focus on an aspect of a scene, say 'car' (152). Feature extractor 106 converts pixels into spatial invariant feature patterns 110. If attention window 100 focuses on the whole scene of FIG. 1B, then all of the features of FIG. 1B will be represented as spatial invariant features 110. If attention window 100 focuses on only the location of car 152 from the scene of FIG. 1B, then the features of car 152 will be represented (preferentially) in spatial invariant features 110.

Feature extractor, such as 106, is known in prior art as an extractor that generates 'a-bag-of-features'. Feature extractor 106 extracts and counts features present in attention window 100. For example if a feature pattern such as pattern 162 of FIG. 1C is found anywhere within attention window 100 of FIG. 1A, then the number of times this feature is encountered is counted regardless of its location within attention window 100. The outcome of this process can be described as spatial invariant features since information is obtained about what features are present and the number of times a particular feature is present without regard to location in attention window 100. A feature and/or an advantage of this invention is a technique and mechanism to redistribute feature information location to spatial locations. This is described in detail later.

Referring back to FIG. 1A, classifier 108 receives the spatial invariant features as inputs and classifies them as representations. FIG. 1D, which represents a side view of a car, includes feature patterns such as hood 192, trunk 194 and wheels 196. Classification is in the form of labeled representations such as 'car'.

Classifier 114 receives representations 112 as inputs and combines them in a hierarchical fashion to allow more complex representations. For example, a car can have different views that are composed of very different feature patterns or base representations. These views may include, for example, front, rear and side views (FIGS. 1E, 1F and 1D). Classifier 114 is designed to accommodate different views of the same object and maintain its identity.

Classifier 114 is also designed to maintain an abstract categorization such as the representation of the concept of 'fruit' (see FIG. 1G) that comprises a collection of "fruits" such as banana, cherry, apple, grape. In this case, the specific fruit (e.g., banana, cherry, apple, graph) is a base representation that includes many features (such as banana stem) to be extracted by the feature extractor.

In an embodiment of the invention, the recognition system generates and/or uses feedback in many or all levels of recognition. For example, each classifier (108, 114) generates its own feedback. Feedback represents how well the inputs are recognized and is used for every aspect of recognition processing. Feedback between processing components will be discussed later herein.

The feedback from the classifiers can be processed to provide detailed information about the recognition progresses. For example, feedback information can be used to determine which area(s) of the scene are poorly recognized. For example, there may be feedback pertaining to the reverse transformation of a feature extractor: from spatially invariant features to the location of pixels that generate them. This transformation is used to designate which features are not well recognized and their location. If an object in a scene is not well recognized, for example tree 154 of FIG. 1B, its features will not be well utilized. The more unused features in a particular location, the more the object in that location needs to be reanalyzed (for example, focused on with attention window 100).

Thus the spatial sum of feedback of such features can be highly informative and employed by embodiments of the invention to improve processing. For example, many of tree 154's unique and unused features may be found at the location of tree 154. This feedback can guide an attention window 100 to the spatial location of the poorly unrecognized object in the scene.

Recognition and search with spatial attention is envisioned to operate as follows: initially the attention window 100 encompasses all of the scene (e.g., all of FIG. 1B). If not all inputs are utilized, attention is focused on regions not well recognized (i.e., regions with a relatively high number unused features). This is repeated until all inputs are satisfactorily recognized. If after extensive scene analysis, the inputs are still not satisfactorily recognized (i.e., many unused features still exist), this may indicate that a new representation (e.g., left front corner of car) needs to be learned.

Figure 2:
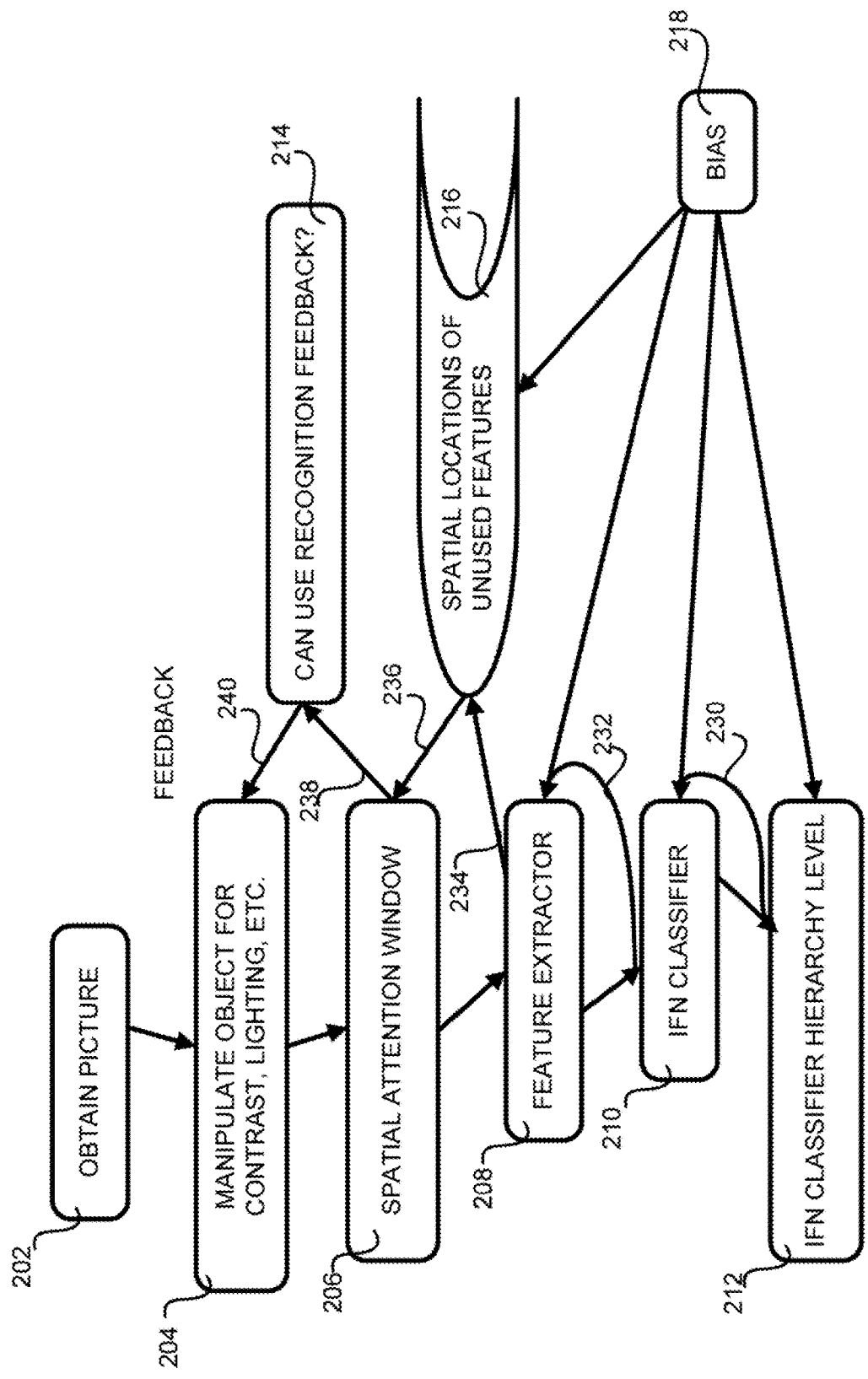
FIG. 2 illustrates, in accordance with embodiments of the invention, some steps relevant to the feedback mechanism.

FIG. 2 illustrates, in accordance with embodiments of the invention, some steps relevant to the feedback mechanism. With reference to FIG. 2, step 202 includes obtaining a picture; step 204 includes manipulating and enhancing the picture for clarification (such as manipulating contrast, lighting, focus, etc.). Step 206 includes applying an attention window to the spatial inputs to analyze the features in the attention window. Step 208 includes extracting features from the attention window; step 210 includes classifying the extracted features into inputs for the hierarchical classifier. These representations serve as inputs for another hierarchical classifier (step 212) connected in a hierarchical fashion.

In addition, there are shown feedback steps which enhance recognition in accordance with embodiments of the invention. For example, the classifiers of the invention provide feedback pertaining to how well each input is recognized. This can guide attention window 100 to focus in areas that are not well-recognized and may be employed to manipulate image filter mechanisms to obtain improved recognition.

The hierarchical classifier (114 in FIG. 1A) can effect the base classifier (108 in FIG. 1A) via feedback (arrow 230 of FIG. 2). The base classifier (108 in FIG. 1A) feeds back which features are not well classified via arrow 232 of FIG. 2.

The feature extractor's reverse transformation 234 can determine which locations (216) are not well classified (i.e., unused). This can guide (236) the attention window 100 to locations requiring further classification. This feedback may also guide image processing (238 and 240) to maximize recognition.

Suppose the base classifier 108 encodes the side view of a car (FIG. 1D). If those features are matched by classifier 108 to a side view representation of a car, this activates the side view representation by classifier 108. In turn, this side view representation of the car serves as an input to a hierarchical classifier 1114. The activation of car by hierarchical classifier 114 slightly activates the other views of car via feedback connection 230. This makes other views of the car (e.g., front view FIG. E or rear view of FIG. 1F) more likely to be recognized.

Thus, the hierarchical representation of the side view of the car primes, via feedback from the hierarchical classifier, other views of car. As the car moves, its back view becomes prominent (e.g., rear view FIG. 1F). The priming can allow continuous recognition of car more likely even though its features, as received by the sensing device, change drastically (between FIGS. 1D, 1E, and 1F).

Biasing is a technique to take further advantage of the feedback qualities of embodiments of the invention to control for search. For example, to find fruit (see, for example, FIG. 1G), the hierarchical representation of fruit can be activated. This feed back to the base classifier, which primes specific fruits such as cherries, oranges and bananas. The primed fruit representations in the base classifier in turn primes (arrow 232) features associated with specific fruits, which are transformed to spatial locations that contain these features and can guide attention window 100 to those locations (arrow 234). If only banana is desired, then the banana representation in the base classifier is biased, and only the features of banana are primed.

Figure 3:
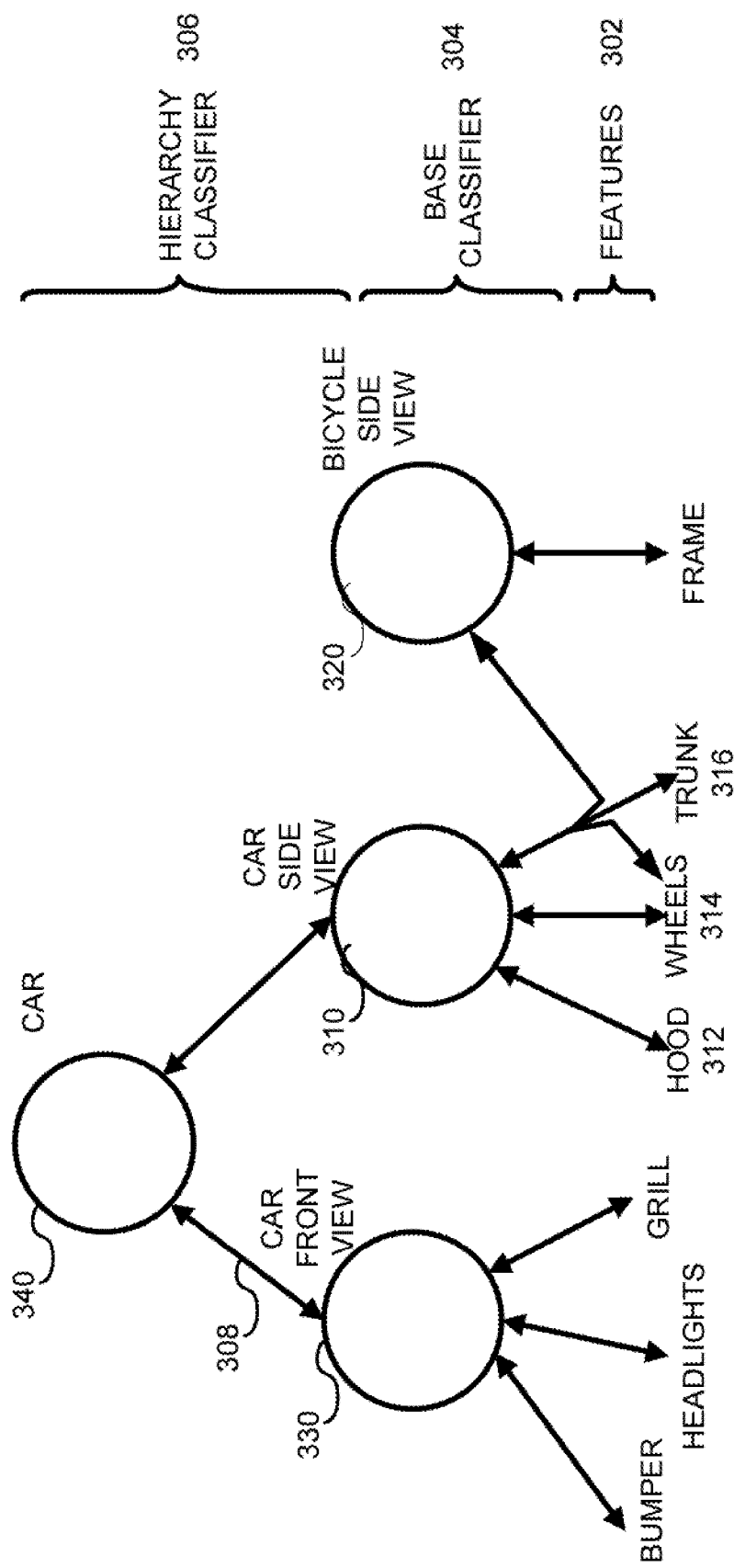
FIG. 3 shows an example of representations within the classifiers (e.g., the base classifier and the hierarchical classifier).

FIG. 3 shows an example of representations within the classifiers (e.g., the base classifier and the hierarchical classifier). Bottom row 302 represents 'basic' features (may even be inputs from a 'lower-level' classifier). Row 304 represents the base classifier row, which classifies the basic features into 'basic' representations. As can be seen in FIG. 3, representations compete for basic features. Row 306 represents the hierarchy layer, which combines basic representations to complex representations that can involve, for example, different views of the same object.

Bidirectional connections (such as for example 308) are all that is needed to calculate representation values. Representations do not need to connect directly to each other (e.g., no direct lateral connections between "car side view" 310 and "bicycle side view" 320)

Figure 4A:
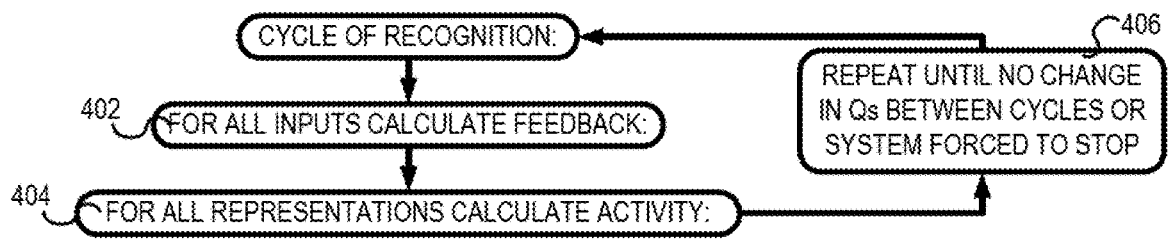
FIG. 4A-4C show, in accordance with embodiments of the invention, the steps of an algorithm that governs the classifier module.
Figure 4B:
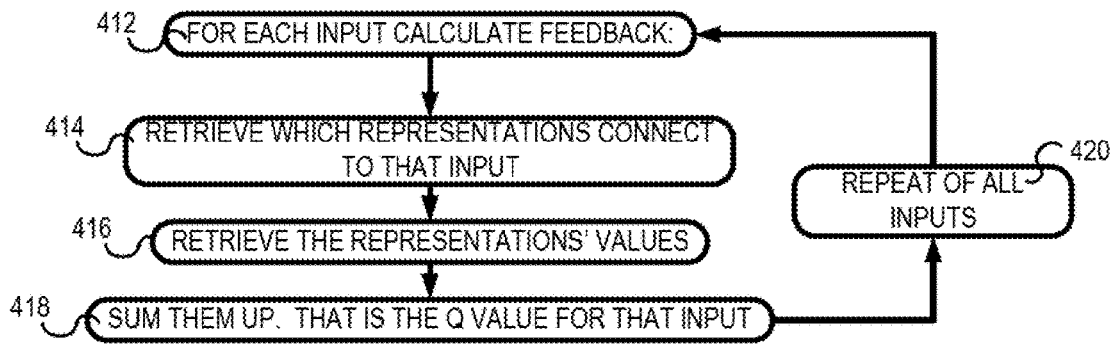
Figure 4C:
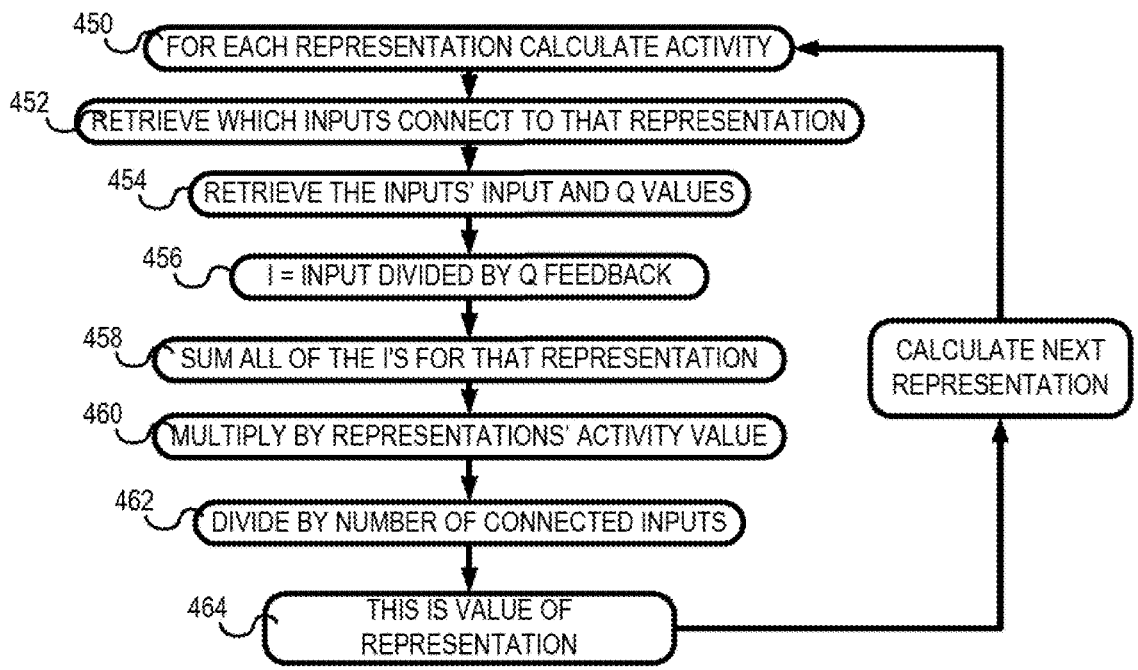

FIG. 4A-4C show, in accordance with embodiments of the invention, the steps of an algorithm that governs the classifier module. In an aspect of the invention, the algorithm that governs the classifier module can both perform recognition and provide feedback regarding the use of inputs. The components of the classifier include: inputs, representations (outputs) and feedback (Q). Values of representations are an estimate how likely that representation is currently present. Feedback, or Q, values indicate how many representations each input supports. There is a one-to-one correspondence between inputs and feedback. Thus every input has a dedicated feedback. Furthermore, the overall algorithm is iterative. This means that the algorithm is repeated with updated information from the previous iteration. It can be terminated at any time, or when it reaches steady state (values cease changing between iterations or the changes are insignificant). In general, the more iterations the algorithm is allowed to execute, the more accurate the results become.

FIG. 4A shows the semi-synchronous update aspect of the algorithm: first all of the inputs' feedback are updated (402), then all of the representations are updated (404). This update cycle can be repeated until there are no changes (or the changes become insignificant) between iterations (406). FIG. 4B shows in greater detail the sub-steps for step 404

(calculate feedback for all inputs), and FIG. 4C shows in greater detail the sub-steps for step 406 (calculate activity for all representations).

FIG. 4B shows, in accordance with an embodiment of the invention, in greater detail the steps for calculating feedback for all inputs. For each input, the feedback is calculated (412) by retrieving (414 & 416) the values of all representations that connect to that input and summing them up (420). All inputs are processed accordingly (420).

With reference to 3 suppose for example that the input (feature) is a wheel. Two representations use wheel: bicycle side view (FIG. 1H) and side view of car (FIG. 1D).

Then the Q value of the wheel is the activation value of the bicycle representation+the activation value of car representation. If the input is the hood, and there is only one representation that uses this input (car), then the Q value for input feature of the hood is activation value of the car.

FIG. 4C shows, in accordance with an embodiment of the invention, the calculation of activity (estimate of how likely it is present) for every representation. For each representation 450 (such as car side view 310 of FIG. 3), all of inputs (hood 312, wheels 314, trunk 316) and their Q values (calculated in FIG. 4B) are retrieved (452/454). Each input value is divided (456) by its associated Q value. Then all of the representations' adjusted input values are summed (458). This is multiplied (460) by the representations' current activity value and is divided (462) by the number of inputs the representation has. The result is the activity value of the representation (464). All other representations are processed accordingly.

For example, if car has features hood, wheels and trunk, then input value of hood (312 in FIG. 3) is divided by Q value of hood to derive the adjusted value of hood. Since Q value of hood is only connected to car, it is the current value of car.

However wheels (314) are connected to both car 310 and bicycle 320 so Q wheel 314=value of car+bicycle. Variants of Q may also be employed. As an example, a variant of Q may be $Q=((car)^2+(bike)^2)^4$. If bicycle representation 320 is active, the adjusted value of wheel 314 (which is the input value of wheel 314 divided by Q of wheel 314) will be less than the adjusted value of hood 312. Thus hood 312 will have more relevance to car 310 because it does not co-activate anything else (such as bicycle). Each of the adjusted inputs (hood, wheel, trunk) of car 310 are calculated and summed. The summed value is multiplied by the current activity of car (310) and divided by 3 (for the 3 inputs: hood, wheel, trunk).

This new activity value of representation for car is an estimation of its presence. The activity value of representation of bicycle is calculated in the same fashion. When all representations are finished, the cycle of FIG. 2A is ready to be repeated.

Figure 5:
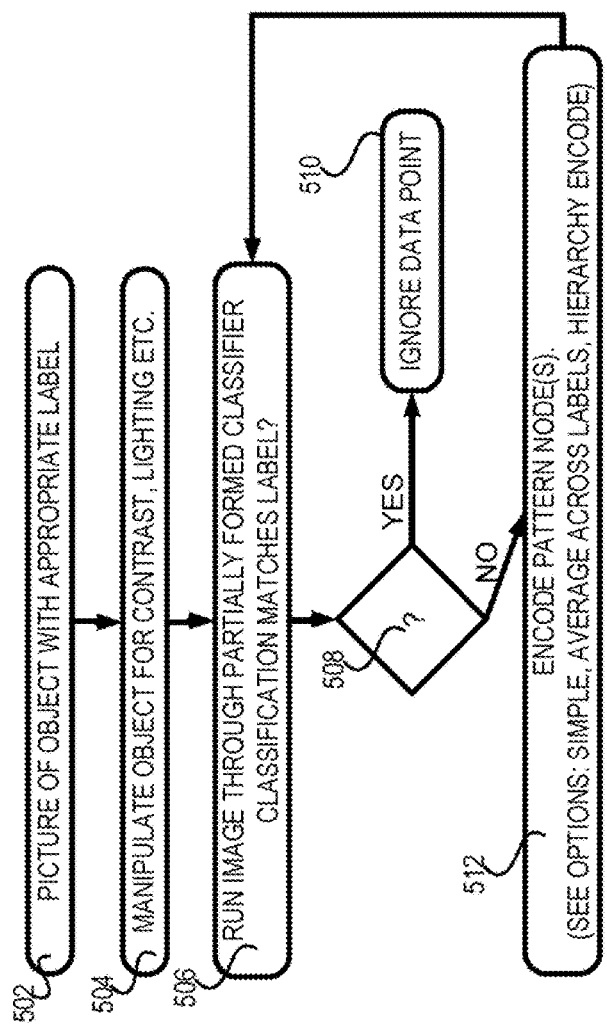
FIG. 5 represents, in accordance with embodiments of the invention, a learning algorithm appropriate for this method.

FIG. 5 represents, in accordance with embodiments of the invention, a learning algorithm appropriate for this method. This algorithm is simpler than the prior art. Learning occurs when the system is given images of objects with appropriate labels. Each image is tested by the classifier (504, 506, 508). If the image is not properly recognized (ascertained in 508), the pattern is encoded in association with its label 512. Encoding is discussed later in connection with FIG. 6. On the other hand, if the image is properly recognized, the data point is ignored (510).

Figure 6:
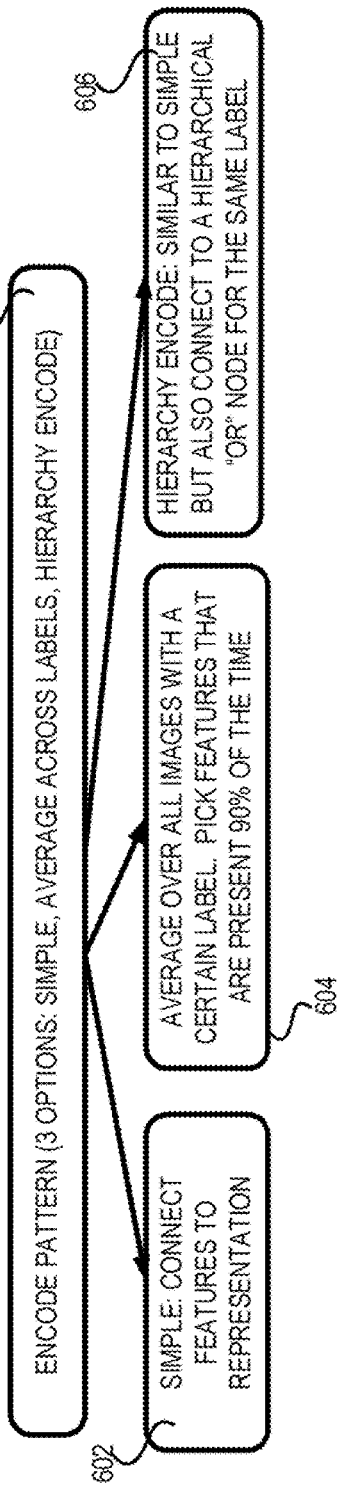
FIG. 6 facilitates the discussion of encoding.

FIG. 6 represents, in accordance with an embodiment of the invention, three strategies for encoding (600). Option 1 (602) involves connecting the active features to a new representation with the appropriate label. If multiple representations are created for the same the label, connect them to a hierarchy node with that label. Option 2 (604) involves arranging all images with a label. Pick features that are present in 90% of the appropriately labeled training data. Option 3 (606) involves connecting in the manner similar to option 1 (602) but also includes connecting to a hierarchical or node for the same label.

With respect to option 1 (602), suppose car and bicycle are being learned and several images of car are present in the training set. The first training sample is a side view of a car. When the training sample is presented to the spatial input 104 of FIG. 1A, it is not recognized even after several iterations because representation 310 (of FIG. 3) does not exist. Then representation 310 of FIG. 3 is encoded along with its label: side view of car. The next image (FIG. 1P pickup) but has a label of 'car'. Pickup is similar to car but not exactly the same. The pickup causes the previously encoded car representation to have activity of 80%. The labels match and 80% it is not enough to encode a new representation. This represents an acceptable amount of recognition, so this image is not encoded. Note: the situation would have been different if the label was pickup. The next image training image is evaluated. Suppose this next representation is a front view of a car (FIG. 1E) and also has the label of 'car'. This is very different than the side view of the car and no representation is activated more than 70%. Then the new representation 330 of FIG. 3 (car front view) is encoded. However there are now two car representations 310 and 330 in FIG. 3. Since there are two representations with different patterns but the same labels, they should both be connected to a hierarchy node for car 340 ("option 3"). This unifies both views. Continue with the next training image (Repeat).

With respect to option 2 (604), this option is more similar to conventional approaches on learning, however connections weights do not need to be determined. Thus the connection is a Boolean (connect or not). The decision to connect is determined when a 'weight' in conventional learning would be strong enough.

With respect to "And/Or" Option 3 (606)': hierarchy representations can be determined as 'and' or 'or'. This effectively is determined by step 462 of FIG. 4 for an individual representation. If step 462 of FIG. 4 is performed then the representation is an 'and'. If step 462 of FIG. 4 is not performed, the representation is an 'or'. In further embodiments the 'or' cell can be subjected to a squashing function (prior art that limits representation from values 0 to 1).

In another embodiment cells can perform either a 'and' and 'or' functions or some variant between these logic functions. This can be implemented by having another signal that controls how much to implement step 462. In effect this signal would determine how much to divide by in step 462. The number to divide by can range between 1 (representing 'or') or divide by the number of connections (representing 'and' function). This signal can be generated via feedback from classifiers (an embodiment).

Weights, if used, may have a different meaning than the prior art. Prior art weights relate the strength of support between a feature and representation. For example how likely wheels are to support car may be determined by a weight '$w_{car}$'. How likely wheels are to support bicycle determined by $w_{bicycle}$, and so on for other representations. In the invention, such weights are not required because such relations are dynamically determined.

Instead, in the invention, weights may represent the relations of features within an object. For example a bicycle will have two wheels and one frame. Thus the features of wheels may be twice as intense. The encoding of bicycle may incorporate this expectation and the weight of wheels may be half of frame. Suppose for example bicycle is only composed of features of wheels and frame. Then bicycle= (wheels features+frame features)/(2 features). But incorporating that two wheels are expected, bicycle may be encoded as: bicycle=(½*(2 wheels)+1*1 frame)/(2 features).

A major advantage of the invention is weights determining whether wheels may support car more than or less than bicycle do not need to be trained. Whether wheels support car or bicycle is determined by feedback which is determined dynamically by what other features are present.

Figure 7:
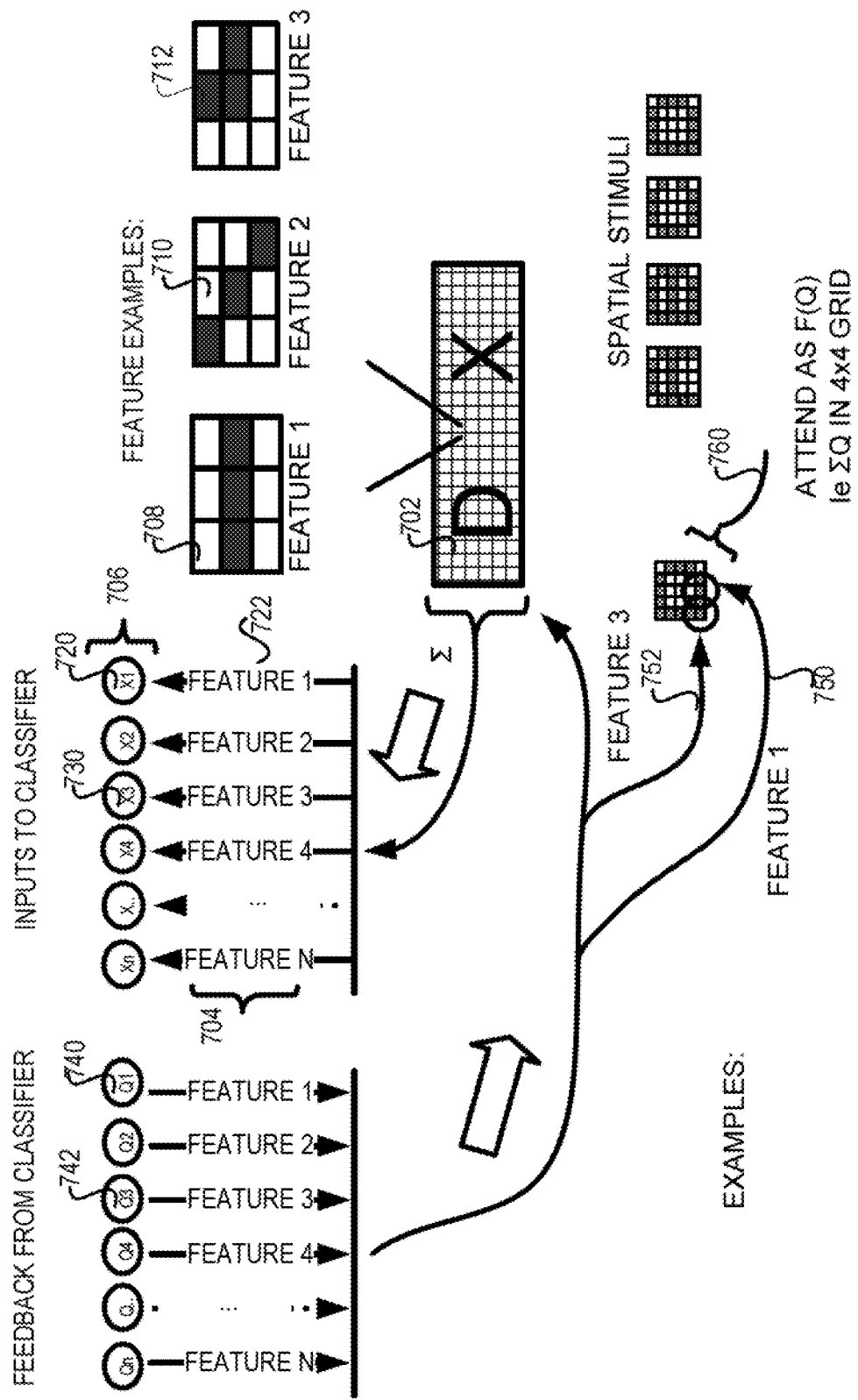
FIG. 7 shows example of a feature extractor.

FIG. 7 shows example of a feature extractor. Prior art aspects are as follows: Pixel inputs 702 represent spatial pixel inputs. Features 1 . . . Features n (704) represent feature designations pertaining to the spatially invariant features. $X_1 \ldots X_n$ (706) are inputs to the base classifier 108 of FIG. 1.

Examples 708, 710, and 712 are examples of Features 1 . . . Features n (704). Each feature pattern, e.g., Feature 1 (708) corresponds to a feature designation ie. 722 (and corresponding feature input 720). If Feature 1 (708) appears in pixel inputs 702, it is counted. The activation value of 720 reflects the number of times Feature 1 (708) appears. In one or more embodiments, the activation may also take into account the intensity of Feature 1 (708) in the inputs (a faint Feature 1 (708) will count less). Thus each feature's value can vary between 0 and a positive real number indicating the intensity or how often the feature is found. The output values of each node will also reflect a similar measure of confidence and count.

In the invention, feedback from the classifier is projected back to the inputs. For example, Q of feature input 720 (pattern 708) is projected back to 740.

For example, wherever pattern 708 is present in pixel inputs 702, the Q value (740) of 722 is projected. For example, if input feature pattern 708 is present in two places in pixel inputs 702, pattern 708 will be counted twice, and the value of 720 will be 2.

Lets assume n is the activation value of 720 (in this case n=2). After classification, 720 will have an associated Q value. Assume the Q value of feature 720=z. The Q values will be available at every point that pattern 708 is counted i.e. 750. If the classifier correctly used 720, n should be equal to z. Wherever the inputs activate pattern 722 (in this case two places), n and z can be compared. Since n=z this is how attention mechanisms knows that that feature at that location is properly recognized and can be ignored. However, if n and z do not match, an attention window can be put around that location.

Other features' Qs are simultaneously projected as well (e.g., 742 associated with input 730, which corresponds to pattern 712). If two features are in close locations, their feedback Q can supplement each other to guide attention. For example if 'D' is not well recognized, then its features are not well recognized (e.g., 750 and 752). The corresponding Q values (740 and 742) will reflect this and project to their location. With a 'D' patterns 708 & 712 will be found next to each other and so will the Q values (750 and 752 respectively). Thus spatial synergy between Q values can indicate locations where objects are not recognized (760) and where (and what size) to wrap the attention window around.

After the attention window wraps around an area, the next set of feedback values from the classifier will reveal how that manipulation affected recognition. Thus how much that focus of attention helped the system will be available to the system.

In embodiments, this iterative manner (similar to classifier function) the feedback back to the inputs can guide attention. The system can jump between stimuli like eye movements jump between stimuli guided by what the person wants to see. Biologically motivated phenomena such as inhibition of return to the next location and other phenomena associated with vision and attention can be implemented in this system.

Figure 8:
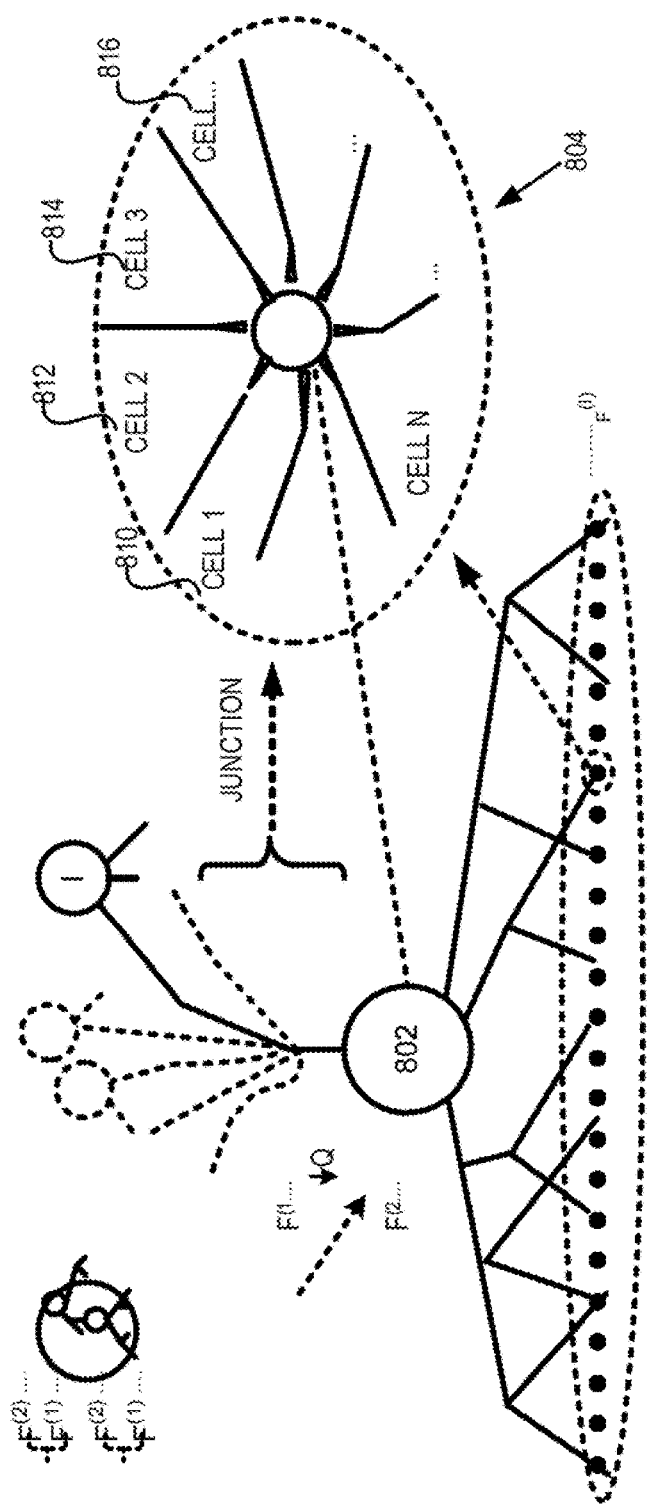
FIG. 8 shows how a representation can 1) be an input to and 2) receive feedback from a higher level classifier.

FIG. 8 shows how a representation can 1) be an input to and 2) receive feedback from a higher level classifier. This figure focuses on the connection junction between a representation in base representation 112 of FIG. 1A and hierarchy representation 116 of FIG. 1A. In FIG. 8, component 804 represents component 802 in greater detail. Component 802 shows a representation in base representation 112 of FIG. 1A that connects to representations that use component 802 in hierarchy representation 804. Connections 810-816 are bidirectional input-feedback connections to the representations in hierarchy representation 116. Activation of representations connected by 810-816 can prime or bias component 802.

Figure 9:
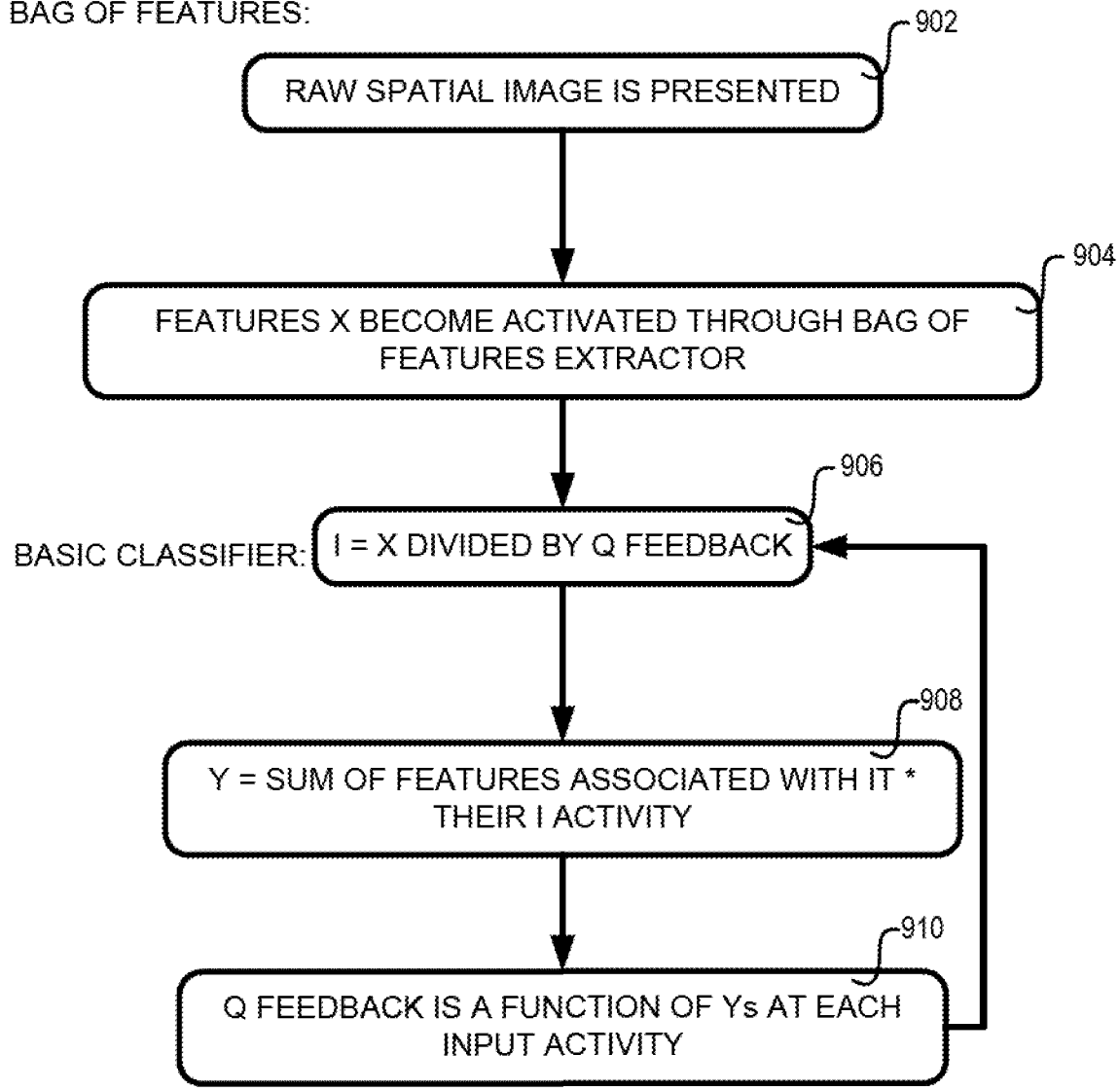
FIG. 9 shows, in accordance with embodiments of the invention, the steps of an algorithm that governs the classifier module.

FIG. 9 is substantially analogous to FIGS. 4A-4C. In steps 902-904, the image is obtained and filtered though a feature extractor. Steps 906, 908, and 910 are analogous to steps of FIGS. 4A-4C.

Figure 10:
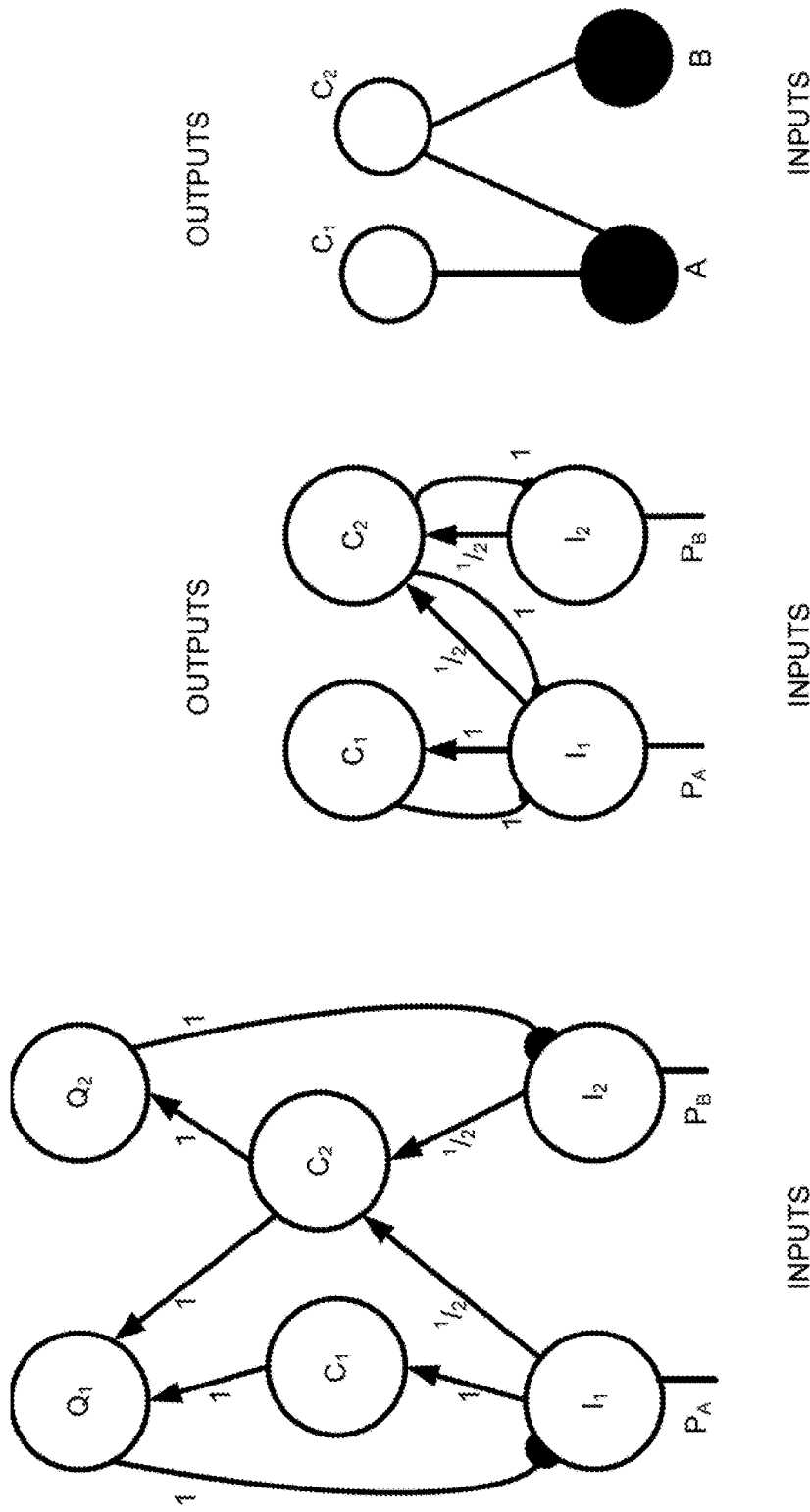
FIG. 10 represents a grossly simplified classifier that has only two representations to facilitate understanding.

FIG. 10 represents a grossly simplified classifier that has only two representations to facilitate understanding. The two representations overlap. Representation 1 (1102) is completely encompassed by representation 2 (1104). This is because representation 1 (1102) shares input 1 with representation 2 (1104) but representation 2 (1104) does not share input 2 with any other representation. Full Schematic (left) shows how Q inputs (I) and outputs (C) are inter-related. The equivalent (middle) representation redraws the same circuit without Q's and bidirectional connections. Shorthand (right) redraws the bidirectional connections with two sided arrows. Weights (numbers outside the circles) are predetermined by network the network. For example in the left $C_1$ receives one input thus its weight value is 1. $C_2$ receives two inputs, thus each is ½ so that the total weight to $C_2$ is maintained as 1. The rest of the weights are 1. This is further elaborated in FIG. 11.

The equations of this system are:

$$C_1(t + dt) = C_1(t) \times I_A = C_1(t)\left(\frac{P_A}{Q_A}\right) = \frac{C_1(t)P_A}{C_1(t) + C_2(t)} \quad (6)$$

$$C_2(t + dt) = \frac{C_2(t)}{2}(I_A + I_B) = \frac{C_2(t)}{2}\left(\frac{P_A}{Q_A} + \frac{P_B}{Q_B}\right)$$

$$= \frac{C_2(t)}{2}\left(\frac{P_A}{C_1(t) + C_2(t)} + \frac{P_B}{C_2(t)}\right) \quad (7)$$

where $Q_A = C_1(t) + C_2(t)$ and $Q_B = C_2(t)$

Figure 11:
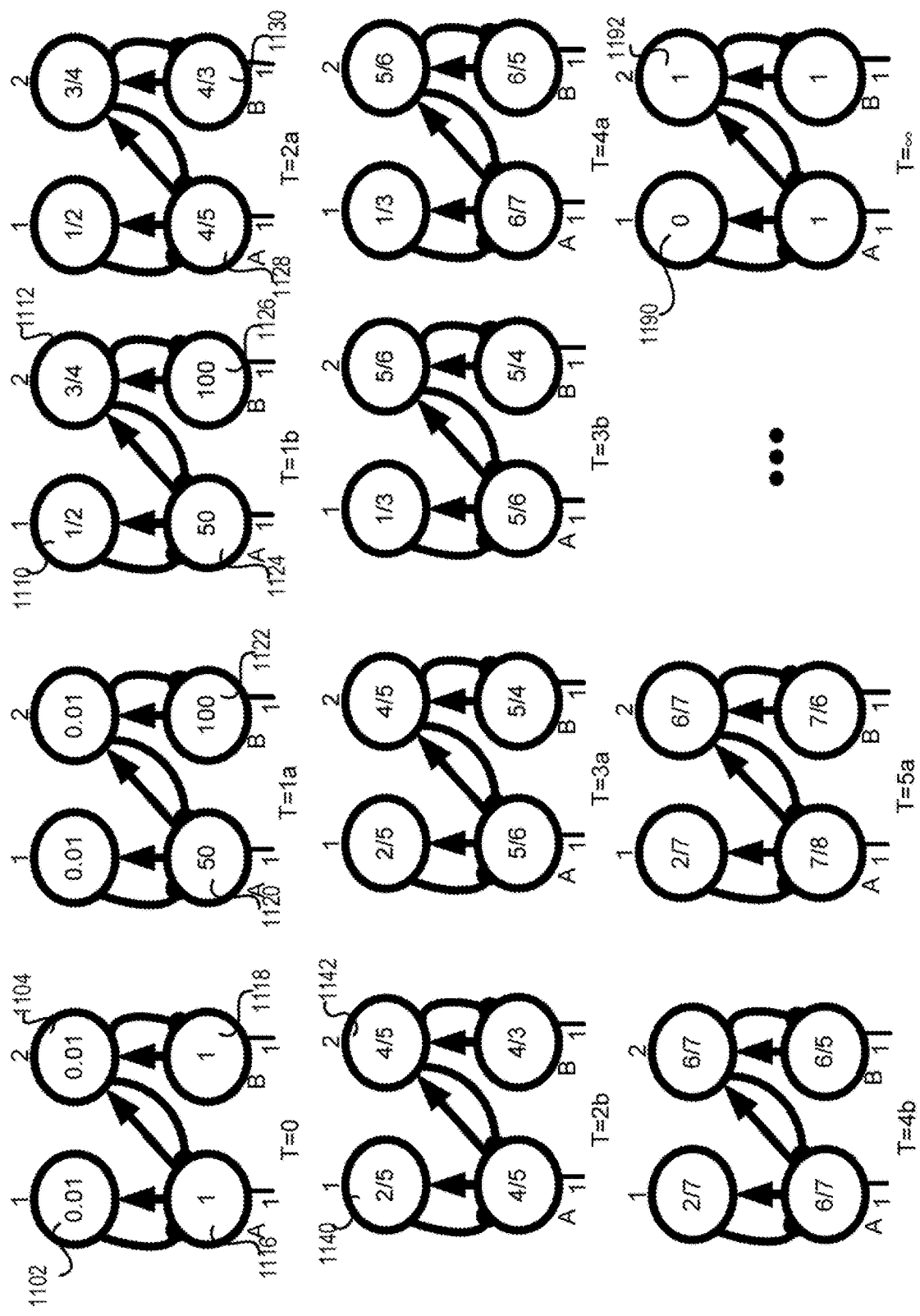
FIG. 11 shows the cycles of FIGS. 4A-4C applied to a simple example.
Figure 12:
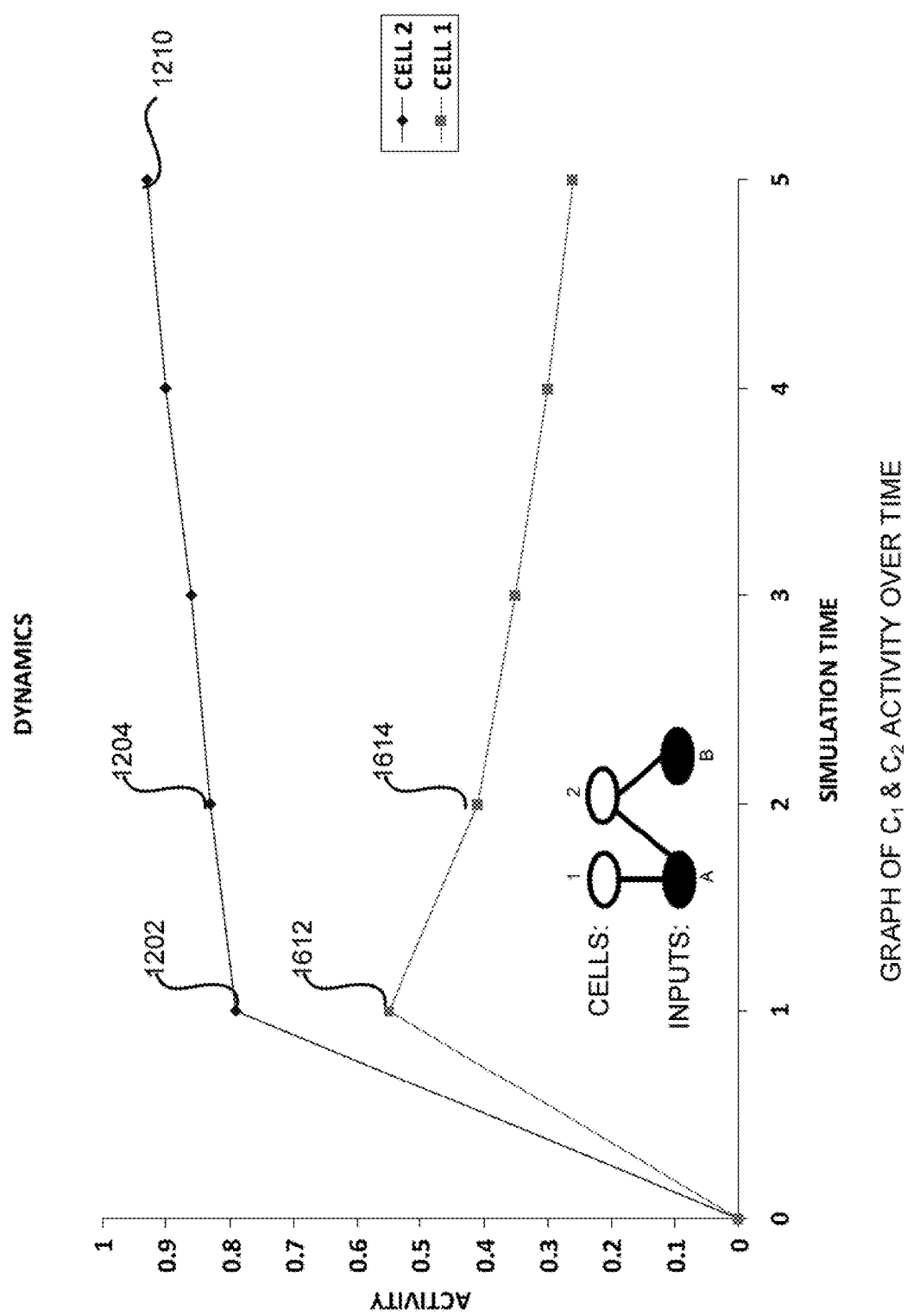
FIG. 12 shows a graph of C1 and C2 activity over time.

FIG. 11 shows the cycles of FIGS. 4A-4C applied to this simple example.

In this example, two representations are connected such that representation 1 (1102) receives inputs A (1116) and representation 2 (1104) receives inputs A (1116) and B (1118). Representation 1 (1102) has one input connection. Its input connection weight is one. Thus, when input A (1116) is one, the maximal activity of representation 1 (1102) sums to the activation value of one. Representation 2 (1104) has two input connections so its input connection weights are one-half. In this way, when both inputs A and B are one, the activity of representation 2 (1104) sums to the activation value of one. Input A (1116) projects to both representation 1 (1102) and representation 2 (1104), thus receives inhibitory feedback from both representation 1 (1102) and representation 2 (1104). Input B (1118) projects only to representation 2 (1104) so it receives inhibitory feedback from representation 2 (1104).

FIG. 11 also shows the computation and dynamics of example 1. It assumes inputs A and B have activation values 1 ($P_A$, $P_B$=1). Shows how the computations are achieved (steps in FIG. 4A). To compute the values assume an initial condition for representation 1 (1102) and representation 2 (1104). Assuming values where both representations are not very active: representation 1 activation value=1/10 and representation 2 activation value=1/10.

T=0 represents the initial condition.

At T=1a (steps 412-418 in FIG. 4B) the activity of representation 1 (1102) and 2 (1104) are projected back to the inputs. Both $I_A$ (1120) and $I_B$ (1122) are boosted because representations that use those inputs (1106 & 1108) are not very active. The activation of $I_A$ and $I_B$ are boosted to drive overall activity on the network towards the 'homeostatic' 1. Note that $I_B$ (1122) is boosted twice as much as $I_A$ (1120) because two representations are using that input (A) (1106 & 1108) and their activity add up to twice as much as activity at input B (1122).

At T=1b (steps 450-462 in FIG. 4C) the new activation of the inputs (1124, 1126) are projected to the output representations (1110, 1112). Note that both representations 1 and 2 (1110, 1112; 1202, 1204 respectively) gain activation. The new activation of the output representation is a nonlinear function of the representation's previous activity and the activity of the inputs normalized by the number of representation processes.

At T=2a (steps 412-418 in FIG. 4B) the activity of representation 1 and 2 (1110, 1112) are projected back to the inputs again (1128, 1130). This time more of $I_A$ and $I_B$ are used by their representations (1110, 1112) thus their associated Q values are closer to 1. Note $I_A$<1 and $I_B$>1 because two representations use the former and one uses the latter.

T=2b This trend continues, reducing representation 1 activity (1140) while increasing representation 2 activity (1142) (1204, 1214 respectively)→∞.

At T=∞ the steady state values of representation 1 becomes 0 (1190) and representation 2 becomes 1 (1192). This occurs because when both inputs are active, representation 1 must compete for all of its inputs with representation 2, however representation 2 only needs to compete for half of its inputs.

Note: in numeric simulations representation activity may be forced to maintain a small epsilon value of activation to avoid dividing by zero thus 0 means ~0. However solving analytically, may not require an epsilon value.

Other Input Values: Not shows in figures.

If input A activation=1 and B=0 ($P_A$=1, $P_B$=0), then representation 1 settles to 1 at steady state, T=∞, and representation 2 settles to 0. This occurs because the connection weight of representation 1 is greater than representation 2 (representation 1 has only one connection representation 2 has two).

If input A=0 and B=1 ($P_A$=0, $P_B$=1), then representation 2 becomes ½ at steady state, and representation 1 becomes 0. This occurs because not all of the inputs of representation 2 are active and none of representation 1's inputs are active.

If input A=1 and B=½ ($P_A$=1, $P_B$=½), then both representations 1 & 2 converge to ½ at steady state. This occurs because all of the inputs for representation 2 are matched up to an activation of ½. This leaves ½ unaccounted in input A for representation 1 to receive.

If input A=1 and B=¼ ($P_A$=1, $P_B$=¼), then representation 1 settles on ¾ and representation 2 on ¼ at steady state. This occurs because all of the inputs for representation 2 are matched up to an activation of ¼. This leaves ¾ activity unaccounted in input A for representation 1 to receive.

The most encompassing representation (1104) will predominate without any special mechanism to adjust the weighting scheme. Thus, if inputs A and B are active representation 2 (1104) wins. This occurs because when both inputs are active, representation 1 (1102) must compete for all of its inputs (1116) with representation 2 (1104), however representation 2 (1104) only needs to compete for half of its inputs (the input shared with representation 1) (1116) and it gets the other half (118) 'free'. This allows representation 2 (1104) to build up more activity and in doing so inhibit representation 1 (1102). The dynamics (FIG. 6a) where originally both representations become activated with the inputs (1202. 1212) but one eventually wins at the expense of the other (1210. 1220) is similar to dynamics seen in the brain.

What will the equations settle to at steady state?

Analysis at steady state: setting C(t+dt)=C(t) and solving for the equations above, we get $C_1=P_A-P_B$ and $C_2=P_B$. Substituting P values we get $C_1$=0 and $C_2$=1. Thus the larger representation wins the competition for representation.

What if input B (1118) is zero? ($P_A$=1, $P_B$=0). Substituting P values we get $C_1$=1 and $C_2$=0. Thus the smaller representation wins the competition for representation.

Note: If $P_A \leq P_B$, then $C_1$=0 and the equation for $C_2$ becomes:

$$C_2 = \frac{P_A + P_B}{2}.$$

Figure 13:
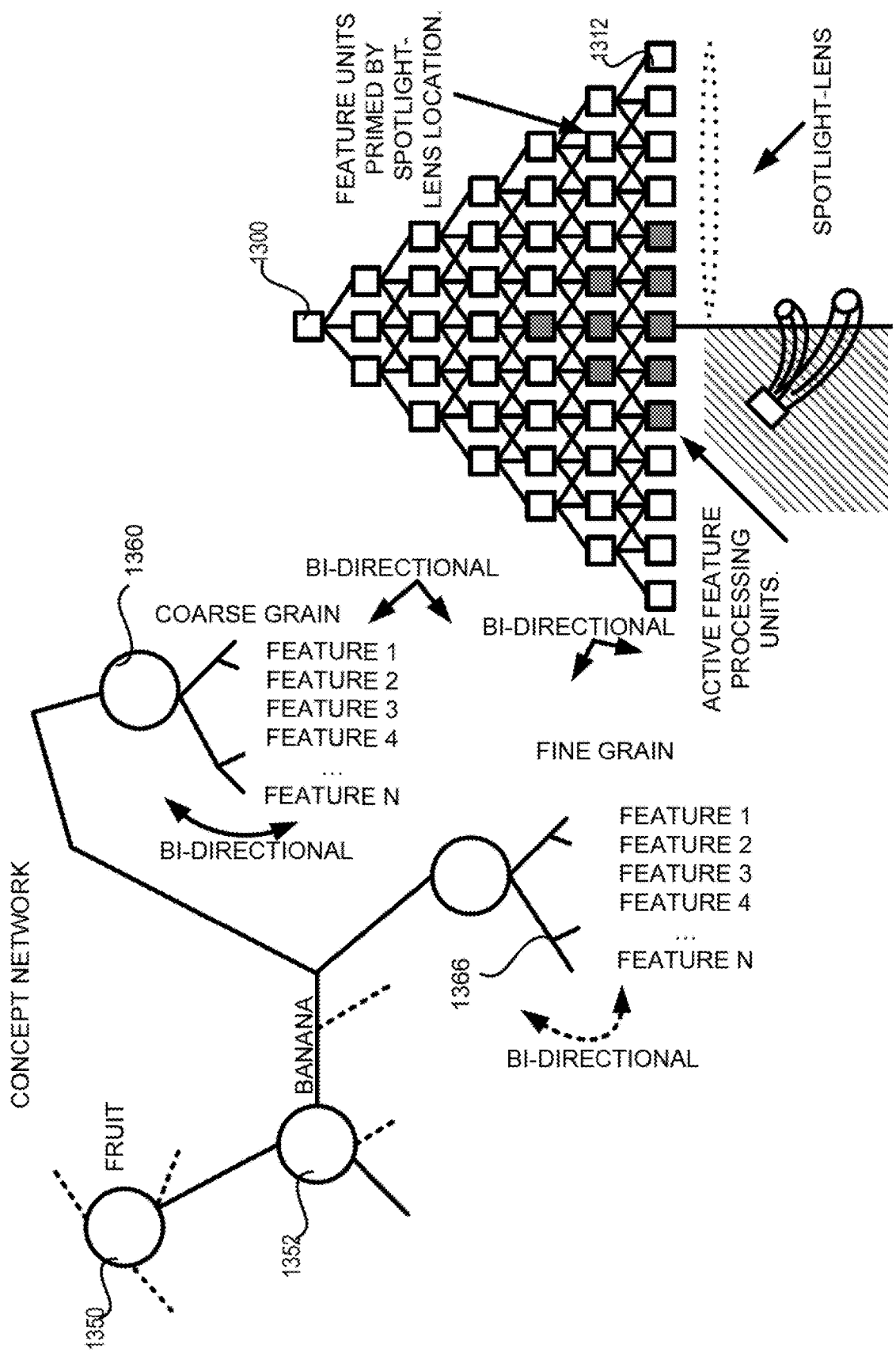
FIG. 13 represents a network which has several feature classifiers based on coarseness.

FIG. 13 represents a network which has several feature classifiers based on coarseness. For example the coarse feature extractor will perform the same function as the fine extractor but with 5 pixels at a time (larger 'pixel'). In this embodiment there are both coarse and fine features and classifiers (1366, 1360) for different levels of coarseness (1312 finer, 1300 coarser). Those classifiers (1366, 1360) serve as inputs to higher hierarchy classifiers of which representations 1350 and 1352 are members. The feedback of coarse/fine classifiers is used to more accurately guide attention window (100 of FIG. 1).

Note several layers of hierarchy can exist. Hierarchy levels can be mixed: i.e., a representation gets both high level representation and feature inputs. This works as long as feedback goes to the appropriate place. If lower level input goes to high level representation. That high level representation must feed back to the low level input. Even if that input is also interacting with base level representations.

Summary of Differences

| | Prior Art (neural networks) | Prior Art (lateral competition) | Invention |
|---|---|---|---|
| Computational method: | a-priori optimization of the strength of connections between inputs and outputs | Competition between outputs | Self-Inhibitory feedback to inputs. |
| Training Determines | Connection weights | Weights and competitors | Determines binary connections (simpler, less extensive) |
| How well is each input recognized? | not available | not available | Compare input to its feedback |
| Scan for poorly recognized inputs | not available | not available | Mechanisms to focus on poorly recognized |
| Bias | not available | Affects relations between output nodes | Changes input characteristics specific to the biased representation |
| Hierarchy + bias | not available | Requires cycling | Controls which inputs and representations are preferred |
| Combinatorial considerations with new node | All weights may have to be adjusted | Everything may be connected to everything else | Modular connections only between inputs and outputs |

Applications of Some Embodiments of the Invention

Research supporting 4 examples are presented:

1) Superposition Catastrophe and Combinatorial Difficulties: invention's unique ability of processing simultaneous patterns 2) Modeling human response times: invention's showing difficulty patterns similar to humans when they visually search for patterns. Thus the invention can be used to predict how much time a human needs to process a display.

3) Modeling experiments Showing Integrated Attention with Recognition. Invention responds to bias manipulation in a similar fashion as brain neurons. This phenomena demonstrates a basis upon which the control of search is applied.

4) Binding and Combinatorial Difficulties: invention's unique ability of processing binding simultaneous patterns by seeking the broadest representations with the least amount of mutual overlap.

5) Effect of bias control on network logic and search. A demonstration of control of search selecting binding behavior and recognition.

1. Example of Combinatorial Difficulty

A simple computational example demonstrates why simplicity, plausibility and functionality of parameter models may not scale well in large circuits as does self-inhibition. Conventional algorithms composed of Neural Networks (NN), Support Vector Machines (SVM), K-Nearest Neighbors (KNN, K=1) which is also similar to Adaptive Resonance Theory (Carpenter and Grossberg 1987) U.S. Pat. No. 5,142,1190, and the invention—Regulatory Feedback Networks (based on pre-synaptic inhibition) are tested. For training each method is given 26 single patterns (features of single letters) and tested on simultaneous representations (features of multiple letters summed and presented to the network). Only Regulatory Feedback Networks correctly recognized the simultaneous representations (tested 100% with up to eight simultaneous letters). This occurs due to nonlinear pre-synaptic feedback, that does not require the training and test distributions to be similar (Achler, Omar et al. 2008). The examples shown here do not have repeating patterns (i.e. two 'a's), however regulatory feedback networks also accurately computes repeated patterns (Achler, Vural, Amir, 2009, in press). This means that if 5 letters are presented for example 2 'a's and 3 'b's simultaneously, the node representing 'a' will have the value of 2 and the node representing 'b' will have the value 3. This counting is achieved without individually isolating any letter spatially.

Figure 14:
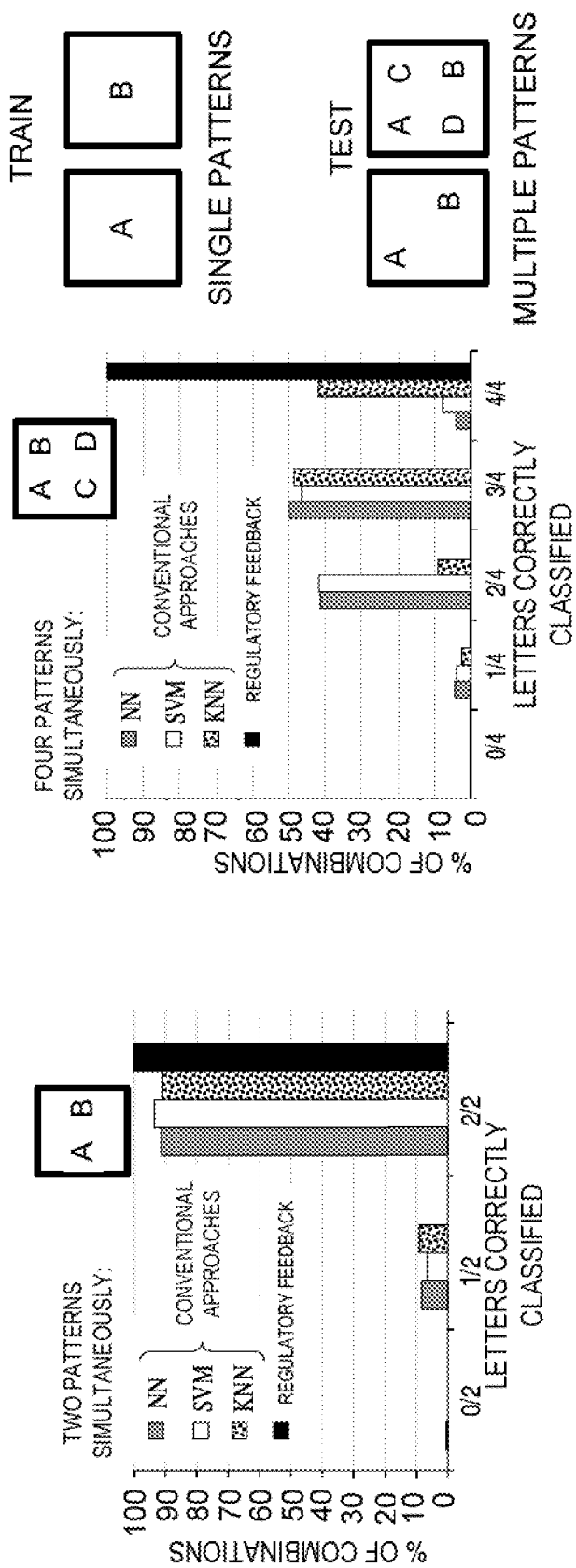
FIG. 14 is a superposition catastrophe demonstration.

FIG. 14: Superposition Catastrophe Demonstration. Each network is trained on the same single letters and tested on the same combinations of the letters. All possible N-letter combinations are tested. The top n active nodes of each network are selected and compared to the presence of original stimuli. The appropriate n/n histogram bin is incremented. If N=4 (right) there are 14,900 possible simultaneous 4 letter combinations, thus training on ~15 k combinations is required to match the test distribution.

Emulating Cognitive Experiments

Similar combinatorial problems occur when modeling cognitive phenomena. For example, human search experiments can measure the difficulty of finding target patterns in a display of non-targets. One of the key factors determining difficulty is the similarity between targets and non-targets. If the target is very different from non-targets, then recognition is accurate and fast. If the target is very similar to non-targets, then performance declines as the number of non-targets is increased. Search difficulty can vary continuously between these extremes based on amount of similarity (Duncan and Humphreys 1989). Another factor is asymmetry (Treisman and Gormican 1988; Wolfe 2001).

Asymmetry is observed when one pattern has an extra feature compared to the other (Treisman and Gormican 1988; Wolfe 2001). For example, it is easier to find an item with a unique attribute, i.e., Q among Os than O among Qs (Q has an extra feature compared to O).

Similarity and asymmetry are difficult to emulate and quantify with conventional models for two reasons: 1) similarity is described in a gestalt manner (such as a parameter chosen based on relatedness). Thus subject to a combinatorial explosion in training. 2) Models expressing such parameters are also subject to combinatorial problems based on connectivity (every representation is related-connected to all others). The proposed pre-synaptic inhibition model mimics the trends of the classical experiments without combinatorial/connectivity issues (because each representation only connects to their own inputs).

The invention can emulate human search experiments showing both similarity and asymmetry effects. If the target is very different from non-targets, then recognition is accurate and fast. If the target is very similar to non-targets, then performance declines as the number of non-targets is increased. With the pre-synaptic inhibition mechanism of the invention, two representations (post-synaptic cells) sharing the same inputs will inhibit each other through these inputs. The more inputs two representations share, the more they will inhibit each other's inputs. The less inputs representations cells share, the less they will interfere with each other. The more similar the target and distractor representations are to each other, the more difficult the search from both a dynamic perspective (it can take longer for nodes to reach a steady state activity) and an activation perspective (steady state values are smaller when similar patterns are simultaneously presented).

Additionally, if one representation has an independent input and another does not, they will be asymmetrical. Both similarity and asymmetry occur without combinatorial/connectivity issues (because each representation only connects to their own inputs). Conventional models with parameter weights or lateral connections suffer from combinatorial problems (more detailed discussion in previous section).

Figure 16:
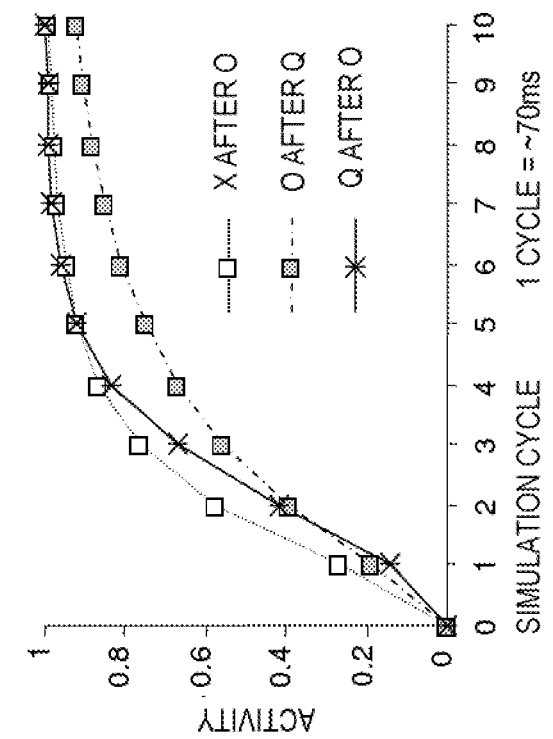
FIG. 16 shows both similarity and asymmetry effects from a dynamics perspective.

FIG. 16 shows both similarity and asymmetry effects from a dynamics perspective. Simulation: X after O: 1) Present O let classify (not shown) 2) Erase O, Present X. Dynamic Example: Dissimilar X after O reaches 1 faster than more similar O after Q and Q after O. But Q after O is faster than O after Q, displaying asymmetry. Searching for an X in O (which are dissimilar) is easier than searching for an O in Q or Q in O (which are more similar to each other). But searching for an O in Q is more difficult than searching for a Q in O displaying asymmetry.

Figure 15:
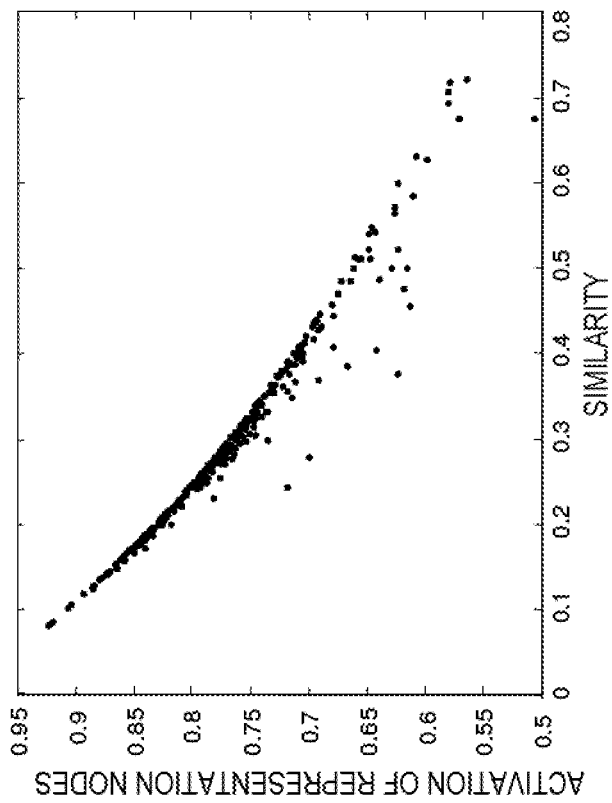
FIG. 15 shows the similarity/difficulty relationship though activation using all 325 of all possible two letter combinations in the alphabet.

FIG. 15 shows the similarity/difficulty relationship though activation using all 325 of all possible two letter combinations in the alphabet. Average activity of cell pairs when both stimuli are simultaneously presented. If cells encode similar representations competition interference is greater and mutual activation is smaller (right). All 325 possible combinations of 2-letters were tested. There is a clear association between similarity and activation: the more similar (patterns share more features) the smaller the activation.

It is important to note the variability: points are not uniform along a line. This occurs because multiple representations interact. The pre-synaptic feedback (by definition a nonlinear function) generates both trends and variability. Yet the network itself has few variables (discussed further in biased competition section).

Emulating Neural Evidence of Integrated Attention with Recognition

In animal recordings, when two patterns (one trained to be preferred) are presented, then the neuron associated with the preferred pattern shows higher baseline activation (bias) even in the absence of any presented pattern. When both patterns are simultaneously presented, then neurons of both representations are not as active (competition interference). Furthermore, the neuron associated with the preferred pattern shows an increased activation relative to other neurons. These interactions occur in many cortical regions, using various stimuli (Desimone and Duncan 1995; Bichot, Rossi et al. 2005; Maunsell and Treue 2006). The underlying mechanisms are poorly understood.

Conventional Networks. Scaling to large networks, models of this phenomenon also require a large number of variables and connections because potentially every representation may affect another. Thus, connectionist models of this phenomenon are: 1) difficult to justify from the perspective of combinatorial plausibility and/or 2) must obtain correct weights for both recognition and the biased competition phenomena. For example, lateral connections (post-synaptic to post-synaptic) become intractable as objects become numerous, because the number of connections between objects explodes combinatorially (FIG. 17D). In the real world there are a prohibitive number of potential combinations, and every possible representation combination would have to be predetermined. Furthermore finding the 'correct' weight values is not trivial. Winner-take-all networks (a form of lateral connections) limit simultaneous cell activation (processing only one cell at a time). Adaptive Resonance Theory (Carpenter and Grossberg 1987) allows sequential processing despite lateral connections, but not as well-suited for simultaneous representations (KNN FIG. 14).

Figure 17:
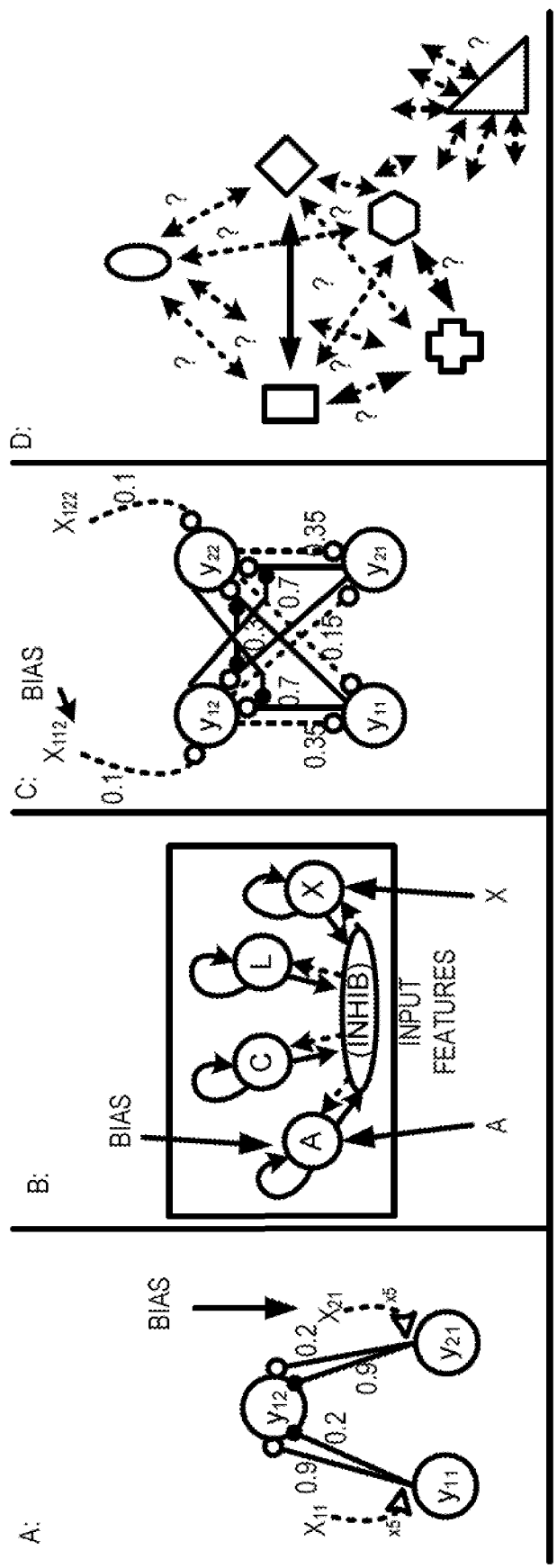
FIG. 17 shows a review of mechanisms of biased competition models

FIG. 17: Review of mechanisms of biased competition models A: Weights between cells are changed during biasing (Reynolds and Desimone 1999). B: Lateral competition through a population of inhibitory cells (Usher and Niebur 1996). C: Lateral inhibition of neighbors and neighbors' inputs (Spratling and Johnson 2004). D: How related should the shapes be to each other? Direct connections require association weights between representations. Connections to all existing shapes need to be determined for each new shape.

The invention using pre-synaptic feedback inherently models integrated recognition-attention and biased competition. No specialized connection weights need to be determined empirically and neurons only connect to their own inputs (avoiding combinatorial issues). Following experiment protocol (present two patterns simultaneously and designate one as preferred using a bias) regulatory feedback displays the same empirical control dynamics as revealed in experiments (FIG. 18, all cells averaged).

Figure 18:
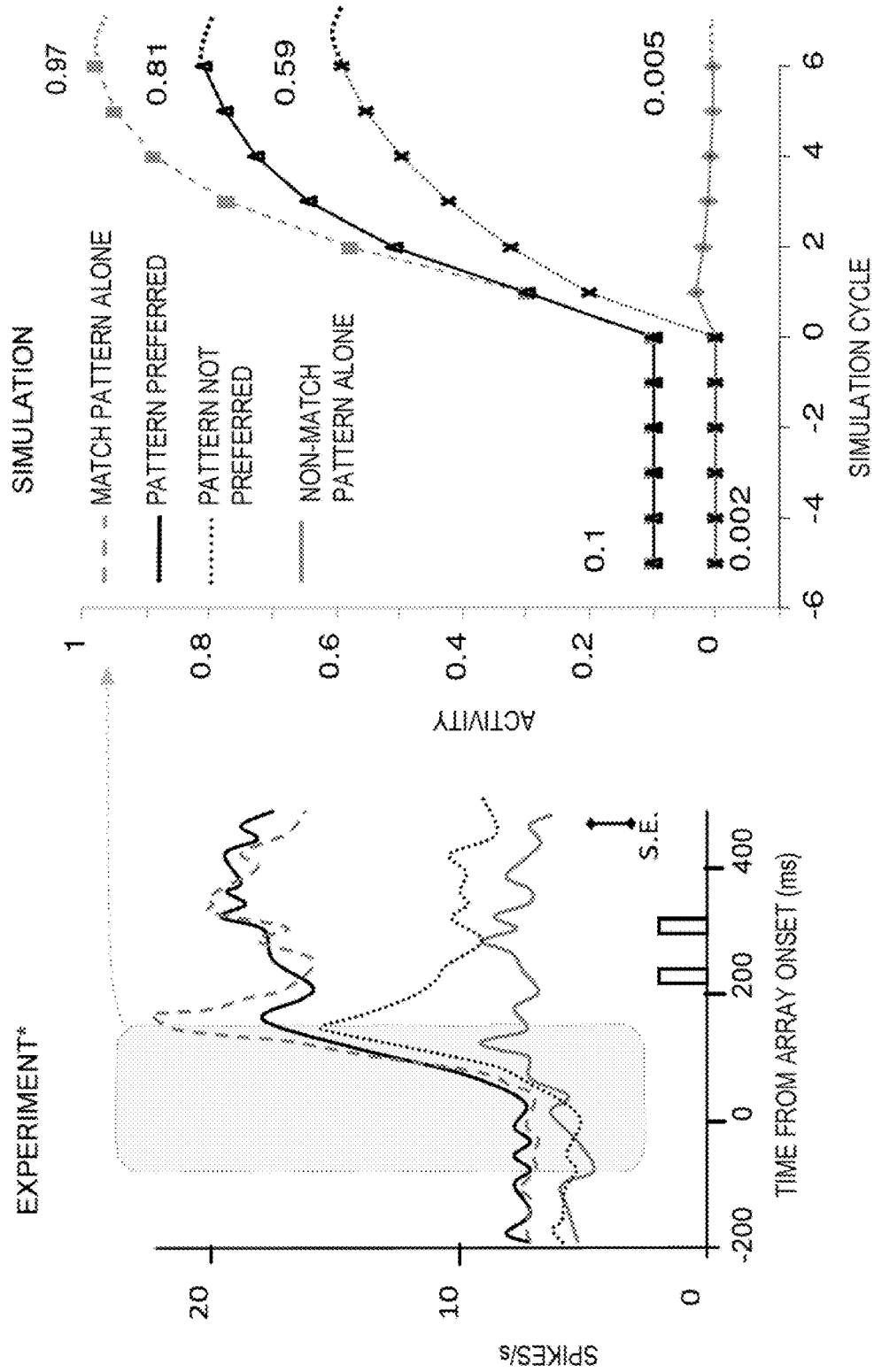
FIG. 18 shows biased competition wherein biased (preferred) cells gain activity while unbiased cells lose activity.

FIG. 18 shows biased competition wherein biased (preferred) cells gain activity while unbiased cells lose activity. In FIG. 18, left: in-vivo experiment (Chelazzi et al, 1998); right: RFN simulation. Also in FIG. 18, match pattern alone—a single pattern is presented matching recorded cell. Non-match pattern alone—a single pattern is presented matching another cell. Pattern Preferred—two patterns with recorded cell preferred. Pattern not preferred—two patterns with a different cell preferred. Small rectangle represents onset of eye movement.

This is important because the network does not include empirical variables for these dynamics (also see cognitive and LTP sections). Thus pre-synaptic feedback (as opposed to specialized neuron parameters) appears to determine biased competition dynamics.

When presented with single letter stimuli, the model is able to recognize all 26 letters by reaching an average steady state activation close to one for the associated node and zero for all others. In addition to correct classification, this model also displays appropriate dynamics and biased competition. Given two simultaneous stimuli, both associated letter nodes show competition interference and on average their steady state activity becomes 0.75.

This competition interference is manipulated with the application of a bias to one of the associated nodes. Note: the biased node is labeled preferred and the non-biased node is labeled unpreferred. At steady state, the attended letter's interference activity increases on average to 0.88 and the unattended letter's activity decreases to 0.73. This represents a gain of 0.126 and a loss of 0.032 to the biased and unbiased representations respectively.

Analyzing dynamics of biased competition, after only 6 cycles, 92% of the biased and only 81% of the unbiased final steady state values are reached (see FIG. 18). Biased representations settled on steady state faster than unbiased representations: 9 vs. 12 cycles respectively (cycles>6 not shown). Thus when a representation is biased its activation and speed increases representing both a sharpening and facilitation of activation (Grill-Spector, Henson et al. 2006).

Figures 19, 20:
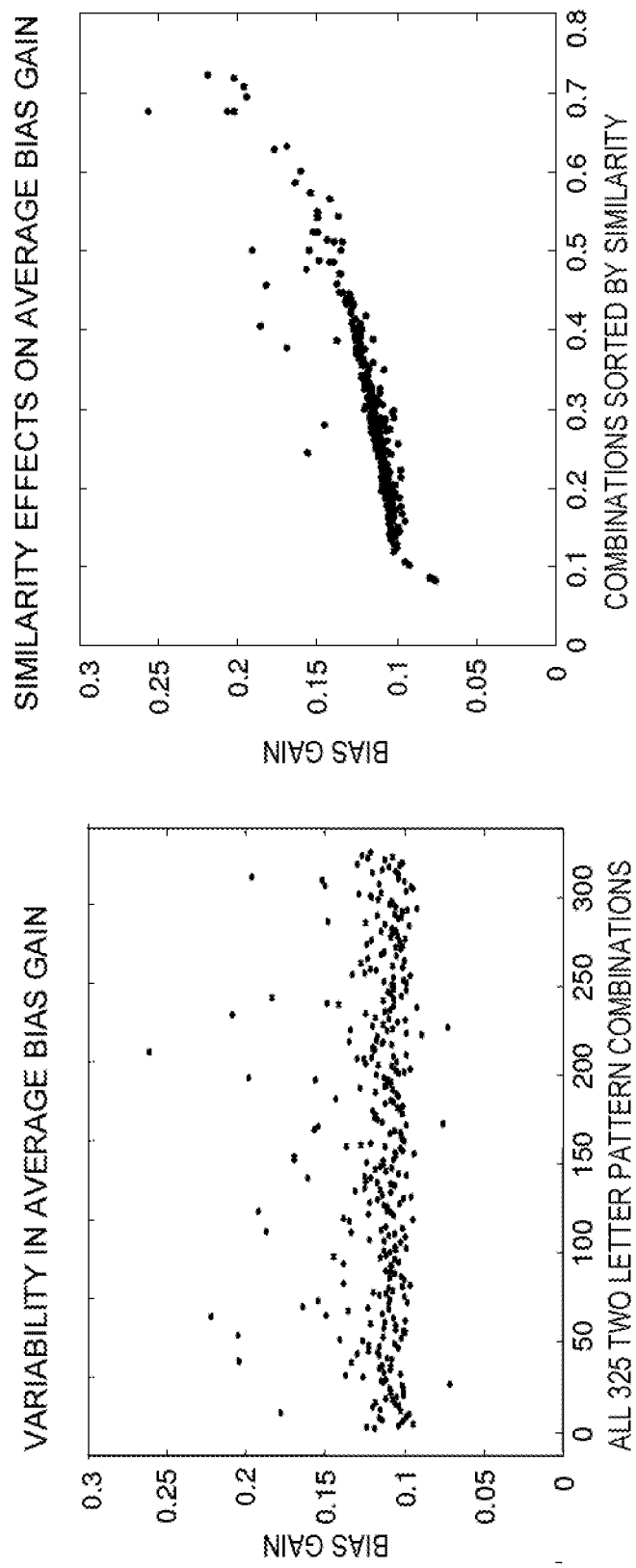
FIG. 19 shows network non-linearity generates biased competition variability
FIG. 20 shows average bias gain given simultaneous stimuli.

In empirical experiments, not all neurons show the same amount of competition interference or biased competition. Similarly, the pre-synaptic network nodes show variability, see FIG. 19. In FIG. 19, network non-linearity generates biased competition variability. All 325 combinations of letters are evaluated.

The standard deviation for this gain is 0.03. This variability occurs because by its nature the pre-synaptic feedback is non-linear and multiple representations may interact. These interactions match empirical dynamics and variability found in electrophysiology experiments (Desimone and Duncan 1995; Luck, Chelazzi et al. 1997; Chelazzi, Duncan et al. 1998).

Lastly, gain and competition interference are affected by similarity between representations. The more similar the given representation is to the biased representation, then the stronger the biased competition effects become (FIG. 20). In FIG. 20, average bias gain is shown given simultaneous stimuli. When representations are similar (right) bias gain is greater. All 325 combinations of letters are evaluated.

Such gain interactions are described by the feature-similarity gain model and seen in experimental observations (Treue and Martinez-Trujillo 1999; Bichot, Rossi et al. 2005; Maunsell and Treue 2006).

The emulation of dynamics and similarity phenomena is unexpected because the connectivity does not involve optimized variables for any of these phenomena. Furthermore, the dynamics of the feedback circuit structure determines these interactions (not properties, parameters, of underlying neurons).

Decision and Binding of Simultaneous Components

The pre-synaptic feedback recognition mechanism prefers representations with the least amount of mutual overlap. This partially addresses the 'binding problem'. Suppose nodes are created in a symbolic/modular fashion where representations may overlap (share inputs), but are simply combined into one network. This defines a network without formally learning which nodes should be preferred given an input pattern. Network function will determine which sets of nodes should cooperate to cover input patterns.

Figure 21:
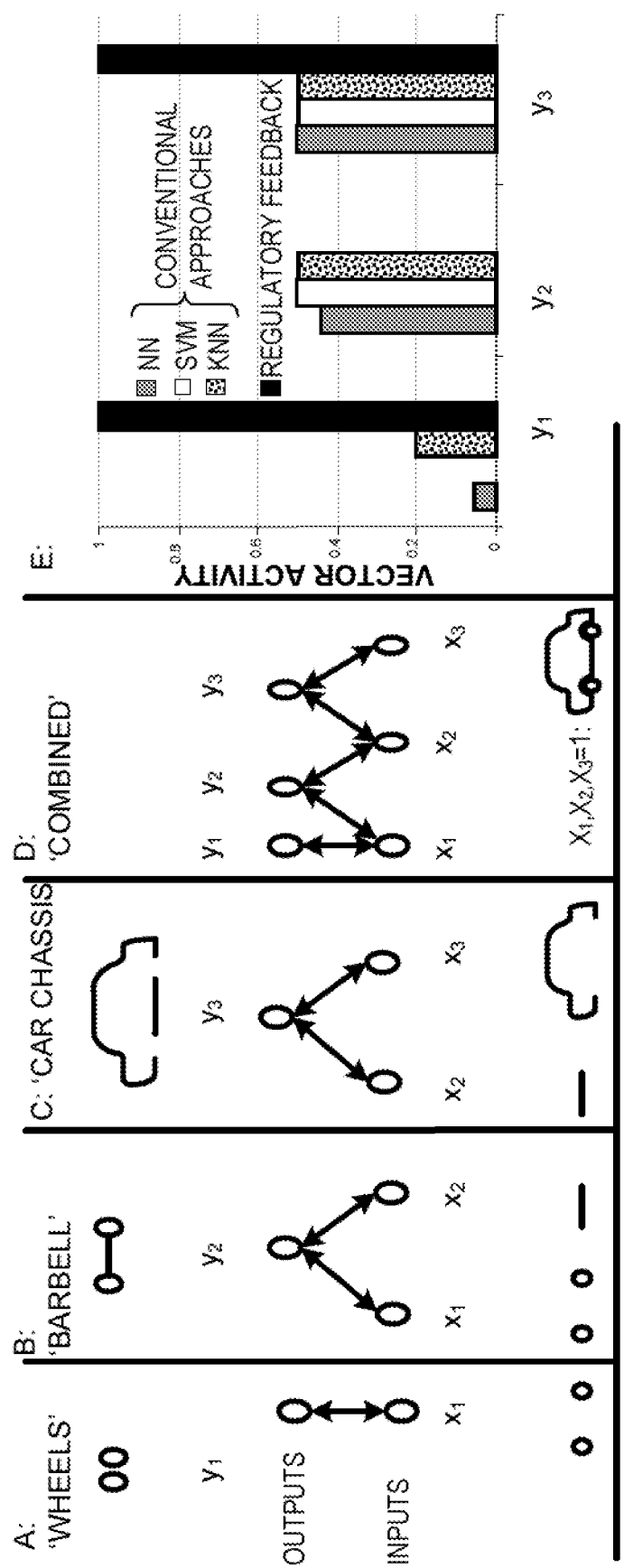
FIG. 21 shows modular combinations of nodes display binding.

FIG. 21 shows modular combinations of nodes display binding. $Y_1$ & $Y_3$ represent car with wheels, $Y_2$ represents barbell. Nodes $Y_1$, $Y_2$, $Y_3$ (A, B & C) can be simply combined to form a combined network (D). Yet these patterns interact in cooperative and competitive manner finding the most efficient configuration with the least amount of overlap. Of recognition algorithms applied (E), only regulatory feedback determines solution $Y_1$ & $Y_3$ which covers all inputs with the least amount of overlap between representations.

In FIG. 21, suppose input features are as follows: $X_1$ circles, $X_3$ a car body outline and $X_2$ a horizontal bar. Representation $Y_1$ is assigned to wheels and thus when it is active, feature $X_1$ is interpreted as wheels. $Y_2$ represents a barbell ⊙—⊙ composed of a bar adjacent to two round weights (features $X_1$ and $X_2$). Note: even though $Y_2$ includes circles (feature $X_1$), during network function they will not represent wheels ($Y_1$) when they represent barbell weights, due to feedback inhibition (Achler and Amir 2008b). Thus if $Y_2$ is active, feature $X_1$ is interpreted as part of the barbell. Lastly $Y_3$ represents a car body without wheels (features $X_2$ and $X_3$), where feature $X_2$ is interpreted as part of the chassis.

The equations become:

$$y_1(t+dt) = \frac{y_1(t)x_1}{y_1(t)+y_2(t)}$$

$$y_2(t+dt) = \frac{y_2(t)}{2}\left(\frac{x_1}{y_1(t)+y_2(t)} + \frac{x_2}{y_2(t)+y_3(t)}\right),$$

$$y_3(t+dt) = \frac{y_3(t)}{2}\left(\frac{x_2}{y_2(t)+y_3(t)} + \frac{x_3}{y_3(t)}\right).$$

Solving for steady state by setting $y_1(t+dt)=y_1(t)$, $y_2(t+dt)=y_2(t)$, and $y_3(t+dt)=y_3(t)$, the solutions are $y_1=x_1-x_2+x_3$, $y_2=x_2-x_3$, $y_3=x_3$. Thus $(x_1, x_2, x_3) \rightarrow (y_1=x_1-x_2+x_3, y_2=x_2-x_3, y_3=x_3)$. If $x_3=0$ the solution becomes that of e.g. 1: $y_1=x_1-x_2$ and $y_2=x_2$. If $x_2 \leq x_3$ then $y_2=0$ and the equations become $y_1=x_1$ and $$y_3 = \frac{x_2 + x_3}{2}.$$

Solutions to particular input activations are (input)→(output): (1, 0, 0)→(1, 0, 0); (1, 1, 0)→(0, 1, 0); (1, 1, 1)→(1, 0, 1).

Given an image of a car with all features simultaneously ($X_1$, $X_2$ and $X_3$), choosing the barbell ($Y_2$) even though technically a correct representation, is equivalent to a binding error within the wrong context in light of all of the inputs. In that case the complete picture is not analyzed in terms of the best fit given all of the information present. Most networks if not trained otherwise are as likely to choose barbell or car chassis (FIG. 21E). With pre-synaptic inhibition, the most encompassing representations mutually predominate without any special mechanism to adjust the weighting scheme.

Effects of Bias and Control

The behavior of the network can be changed by forcing the values of the output nodes. The value of a node can be artificially increased or decreased. For example, forcing a representation to have a zero value is equivalent to eliminating it from the network. Artificially activating or biasing a representation gives it priority over other nodes and can forces its representation to override inherent binding processes.

The example in FIG. 21 is repeated but the question is asked: can a barbell shape be found in any form? To search for barbell a small bias to the barbell node $Y_2$ is introduced (same as applied in biased competition and cognitive control).

The equation is $$Y_2(t+dt) = \frac{Y_2(t)}{2}\left(\frac{X_1}{Y_1(t)+Y_2(t)} + \frac{X_2}{Y_2(t)+Y_3(t)}\right) + b$$

Choosing a bias b of 0.2 and presenting all inputs (car), the network results are: (1, 1, 1)→(0.02, 0.98, 0.71) where $Y_1$=0.02; $Y_2$=0.98; $Y_3$=0.71. The network now overrides its inherent properties and responds to whether inputs matching $Y_2$ are present. This is a form of symbolic control closely tied to recognition.

This is an important property of the invention that is envisioned to provide control of the networks to perform goal oriented searches by biasing representations according to search goal (ie. apply positive bias to search for something, apply bias towards zero to ignore something)

Cognitive or symbolic control of representations allows the control of search and the modeling of additional search phenomena. The core recognition processing of the invention (pre-synaptic inhibition) is unique since it incorporates direct symmetric feedback to inputs (feed forward processes are the same as feedback processes). This structure inherently allows a straightforward and intuitive control of the very features used to determine the recognition of an object. A simple activation of an object representation will affect the efficacy of its inputs. Such activation of a representation is labeled a bias.

In the brain bias activation is well documented. A bias may occur due to active selection (i.e. determined by the frontal cortex or any other structure responsible for behavior) and/or repetition (learning or priming). The affect of biasing can increase response amplitudes and response times. A bias can even change which representation is recognized (see biased competition section).

While a representation given a positive bias will be preferred, a representation driven by a negative value will be inhibited and its representation will reduced. Activation will be slower and have a smaller amplitude. This is analogous to the cognitive phenomena of negative priming where reaction to target stimuli that have been previously ignored is slower. Similarly, a negative bias can be applied when a representation is irrelevant in a search or causes an erroneous response.

Such effects can display logic properties within a cognitive hierarchy of regulatory feedback nodes where more abstract representations are built up of more specific representations (i.e food=tomatoes, lasagna, beans, etc.). Feedback from regulatory feedback networks can work in a hierarchy where feedback and bias will affect lower 'input' levels which are representations.

Additionally evaluating feedback, to inputs can determine how well each input is recognized. This can be used to determine where in space most features are not well recognized. This can then guide spatial attention processes. The control and learning of these hierarchy constructs are a major part of the proposal development to make a behaving recognition system.

Thus the system is foreseen to be configurable to do an automatic search behavior. For example bias food will bias the more specific representations of food which will affect patterns associated with food. The spatial concentration the most of features receiving feedback will attract spatial attention. Such feedback will be affected by the bias of the hierarchy.

It is important to note that no other neural configuration captures this degree of feedback control. For example through lateral inhibition, control is less direct. Biasing a representation will only affect its activation relative to other representations, not alter its inputs. Neural networks do not have such feedback.

Emulating Memory and Synaptic Plasticity with Pre-Synaptic Inhibition and Bias

The phenomenon of Long Term Potentiation (LTP) (commonly associated with reinforcement learning) is generally assumed to occur due to connection changes (synaptic plasticity). Yet the fundamental cellular mechanisms involved are still unclear, i.e. (Froemke, Tsay et al. 2006). The synaptic plasticity hypothesis assumes only the recorded pre-synaptic and post-synaptic cells are involved in the LTP phenomena. However, the high-frequency stimulation required for LTP induction affects many post-synaptic cells.

When neurons are connected via pre-synaptic feedback, then a small effect on multiple post-synaptic cells can dramatically affect networks. Undetectable changes in the activity of post-synaptic neurons feeding back to the recorded pre-synaptic neuron can synergistically alter the network function and generate LTP. In experiments reviewed: 1) there are always more neurons present than a single pre and a single post synaptic neuron 2) the activity of the recorded cells vary much more than the activity necessary to demonstrate a regulatory feedback mechanism for LTP. This suggests that in reviewed LTP experiments it is not possible to determine whether LTP occurs via connection change or self-regulatory feedback. This mechanism questions the evidence supporting modification of weight parameters.

Figure 22:
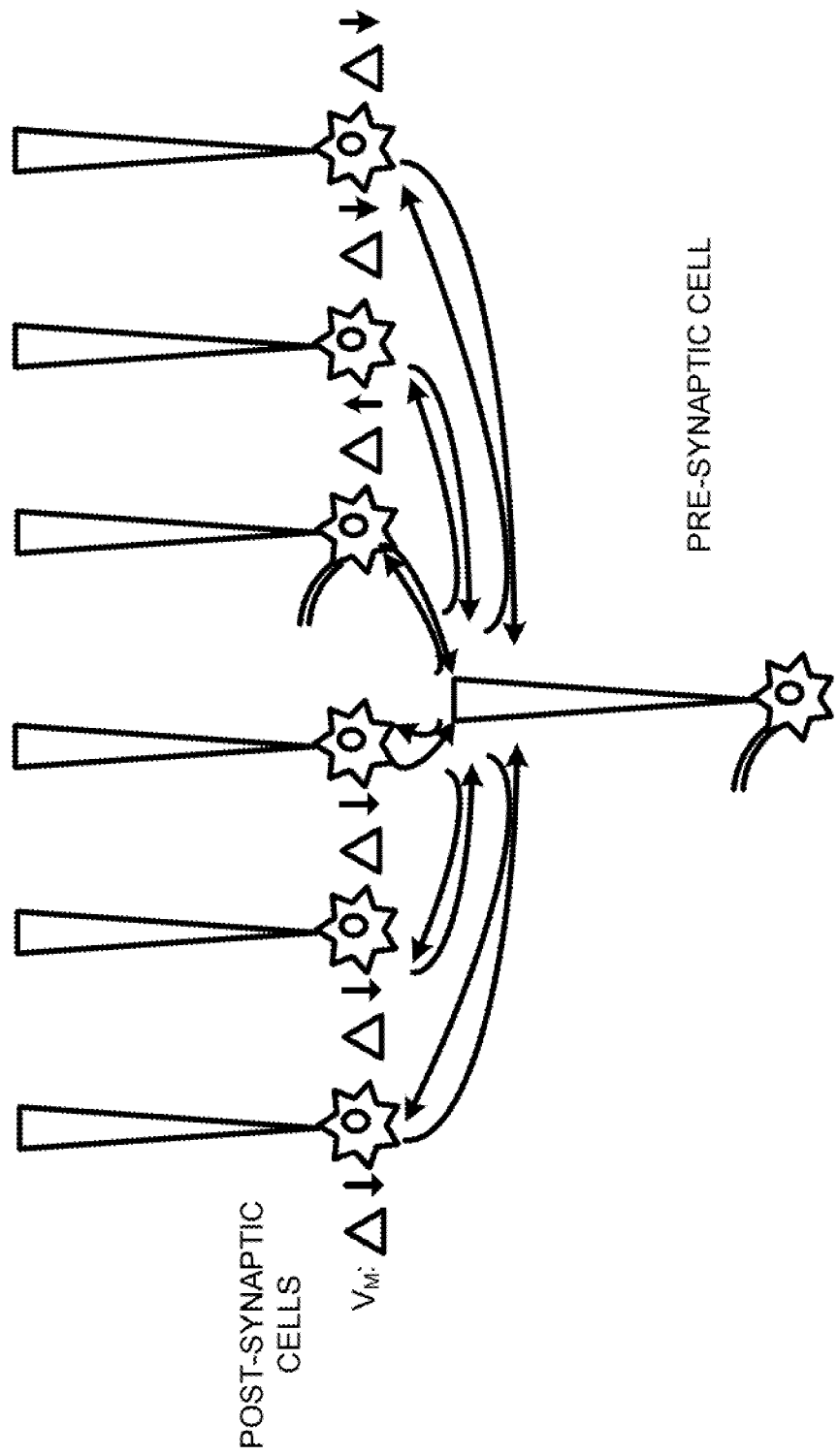
FIG. 22 shows that cells can synergistically affect the pre-synaptic cell.

To demonstrate this, LTP experiments are simulated. Assuming suitable pre-synaptic and post-synaptic electrode locations are found (input and output electrodes respectively; yellow cells in FIG. 22), LTP activation protocol is followed. FIG. 22 shows that if a pre-synaptic cell connects to postsynaptic cells, then those cells can synergistically affect the pre-synaptic cell. The recorded cells are the third from right on the top row and the single cell on the bottom. The stimulation of the input (pre-synaptic) electrode (using neuron-like spike activation patterns) is increased until there is 50% chance to record spikes from the output electrode (activity value of 0.5). Let's label the required spiking rate and amplitude settings of the input electrode that satisfy the output characteristic as Amplitude of 50% ($A_{50}$).

Then 'learning' is 'induced'. LTP induction is a simultaneous high frequency repetition of artificial neuron-like spike activation patterns of both the input and output electrodes. After induction is complete, $A_{50}$ is applied to the input and any changes in the output electrode are observed. If the output activity is >50% then long term potentiation (LTP; increase) occurred. If the output activity is <50% then long term depression (LTD; decrease) occurred. The same 26 cell network is used and it is assumed all post-synaptic nodes connected to the pre-synaptic electrode changed their bias potential slightly (and subsequently resting membrane voltage $V_m$).

Figure 23:
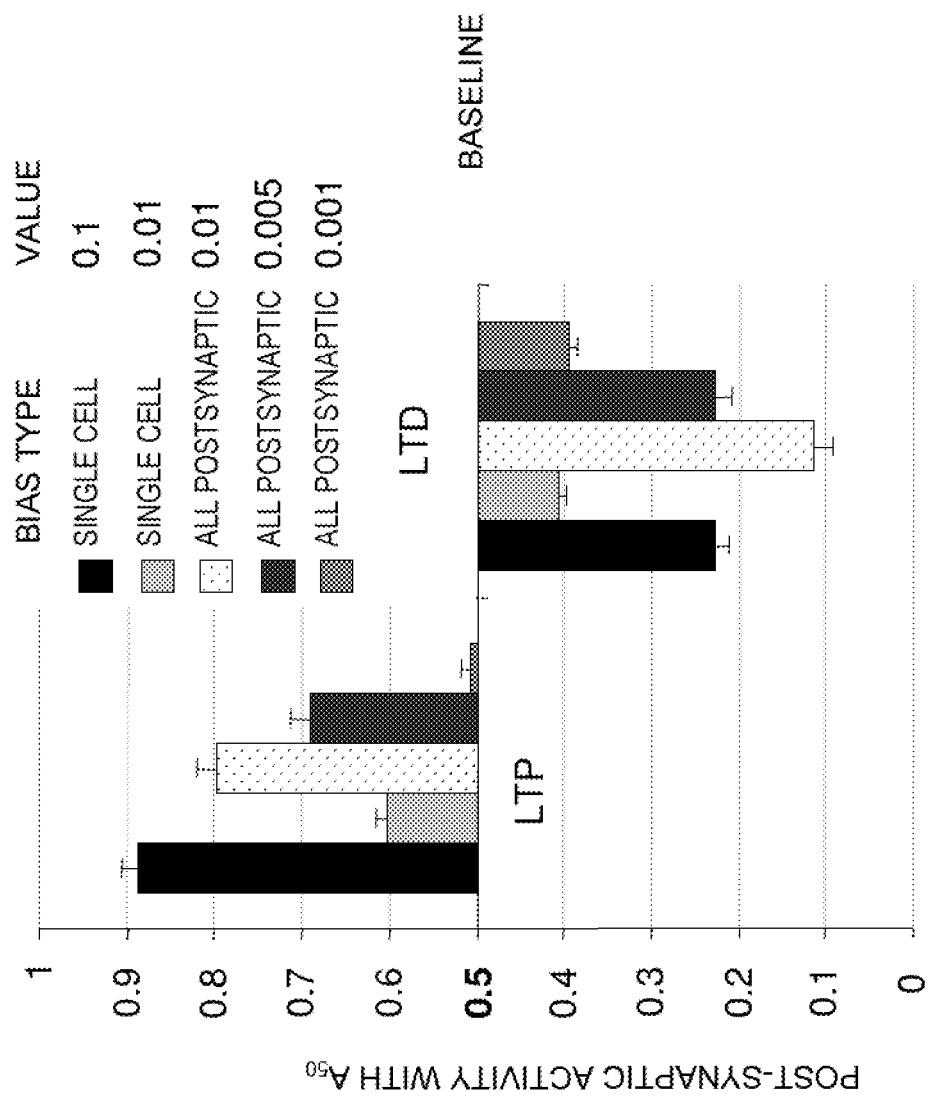
FIG. 23 shows post-synaptic change using bias.

In LTP experiments membrane voltage $V_m$ of cells are allowed to vary by about 6 mV i.e. (Cudmore and Turrigiano 2004; Froemke, Tsay et al. 2006). Experimentally $R_{in}$=~250 MΩ, therefore a Δ bias rate of 0.005=~$\Delta V_m$ of 0.15 mV. A change of 0.15 mV for each cell is well below membrane voltage sensitivity of experiments. Yet results in ~50% change in spiking of the recorded post-synaptic cell (see FIG. 23). FIG. 23 shows post-synaptic change using bias.

'Synaptic change' is emulated using small biases of multiple postsynaptic cells or a larger bias of a single cell.

In the simulation, each input could at most connect to 26 output cells (that recognize letters). However on average each pre-synaptic cell only connected to a subset of the 26 post-synaptic cells. With more output (post-synaptic) cells, each would require even less activation. In the brain each pre-synaptic neuron probably connects to thousands of post-synaptic neurons, thus likely much more sensitive than the demonstration presented.

In summary, this approach offers an explanation for ubiquitous pre-synaptic connections found throughout the brain and explains disparate phenomena without applying the traditional notion of variable connection weights and synaptic plasticity. The example based on pre-synaptic feedback forms a powerful classifier and displays biased competition including neuron-dynamics, LTP and LTD. Furthermore current methods in electrophysiology may not be sufficient to differentiate between LTP mechanisms involving synaptic plasticity or pre-synaptic inhibition with bias. Thus fundamental questions about brain function are broached.

Neural and Recognition Application Summary

Changing focus from the state of the art that focuses on learning, towards the invention that focuses on pre-synaptic inhibition is a promising step towards more robust recognition processing and understanding of the brain.

Using well documented anatomical/electrophysiological findings, the pre-synaptic inhibition algorithm avoids combinatorial explosions and captures cognitive and electrophysiology phenomena with less variables. Recognition is more robust, resistant to superposition catastrophe and addresses important issues pertaining to binding. It inherently displays integrated recognition-attention phenomena of biased competition and can be controlled by bias.

Furthermore, interactions between pre and post synaptic cells question the validity of the synaptic plasticity hypothesis (which in turn further questions the neuron-level reinforcement learning hypothesis of neural networks). Thus it has the potential to change the perspectives of several fields related to computation and brain studies Production and Genetic Analysis Applications Though many potential components of Genetic Regulatory Networks have been described i.e. (Milo, Shen-Orr et al. 2002), the overall purpose of each of these branches are not well appreciated. Often models use a subset of these connections and associate them with parameters describing the 'strength or efficacy' of these connections. These parameters are fitted to the data. The problem is that with enough parameters and components any data can be modeled. The particular values of the parameters may have little relevance beyond the dataset tested. There is no guarantee that that particular configuration is the only solution (unique). Furthermore this method inherently ignores certain types of connections because they are not easily solvable mathematically.

For survival the genetic system has to be robust and maintain homeostasis. This serves as the starting point the proposed model. The basic assumption is that each gene is closely regulated by its products. If a gene produces products (end products and intermediaries) then it is regulated by those products. This homeostasis maintains a fixed concentration of that product. If the products are consumed, to maintain levels, more is produced by the homeostasis mechanisms. If too much is accumulated, less is produced. However, products can share pathways of consumption or production. For example, a product can be produced by separate pathways, or consumed for different purposes. For regulation to effectively occur, expression of the genes whose products cooperate must be coordinated. Genes can 'communicate' and regulate each other through these products.

The self-regulatory invention can be extended to a theory of gene regulation. If a protocol of self-regulation is preserved for simple gene-product combinations, this holds for more complex networks which find efficient configurations of expression that minimize the amounts of extraneous byproducts. A better appreciation of this purpose can guide experiment design, reveal new methods to control gene regulation, and design genetic therapies.

Genetic Network Background

Regulatory gene networks reveal complex interactions between genes and the cellular environment they control. Genes not only autoregulate their expression they interact with each other via numerous mechanisms within the process of converting DNA to final proteins. Transcription of gene DNA to mRNA is controlled by transcription factors, maintenance and folding proteins. Pre-mRNA products can be alternatively spliced to into various forms of mRNA. Translation of mRNA to protein is affected by folding and transport proteins through co-translational mechanisms. Once created these proteins are under control of metabolic pathways which help maintain appropriate concentrations of products. These products form a gene regulatory networks which integrate multiple signals in the form of protein concentrations to ultimately determine protein production. Expression (measured by this production) is ultimately regulated by concentrations of products and intermediaries of metabolic pathways.

Understanding genetic-protein structure and dynamics relationships in networks is a major goal of complex systems research (Nochomovitz and Li 2006). Although numerous relationships between specific structural and dynamical aspects of network components have been investigated (Albert, Jeong et al. 2000; Kauffman, Peterson et al. 2003; Shmulevich, Lahdesmaki et al. 2003), general principles behind such relationships are still unknown (Nykter, Price et al. 2008). In summary, a high degree of regulation occurs throughout genetic-protein production pathways, but the detailed aspects of all of the mechanisms involved are unclear.

Analytic methods may focus on certain types of relations because they are more tractable mathematically. Most focus on direct gene to gene interactions (i.e. gene1 interacts with gene2).

However the similar interactions may occur with less mathematically tractable, 'indirect' interactions. For example, if gene1 and gene2 share (and regulate) the same product or pathway, one gene's production of that product will affect the other genes that produce that product. All genes that regulate the same product reach equilibrium. Any change in the communal equilibrium changes the expression of multiple genes. Such gene-product regulation form indirect and nonlinear gene-gene interactions. With a simple closely regulated relationship between gene promoters and products, a system can emerge that implements a recognition system (Achler 2007; Achler and Amir 2008; Achler, Omar et al. 2008), and was originally developed as a model for neuronal interactions (Achler 2002; Achler 2007). These properties are demonstrated within the context of genetic regulatory networks, and may be applied to any production pathway that closely regulates its components in the manner described.

Basic Assumptions for Production Pathways

The most important requirement, on which this method builds upon, is homeostasis. Mechanisms must be configured for each node in the pathway so that if too much product is consumed, a gene's promoter mechanism signals more to be expressed. If too little is consumed, promoters signal less to be expressed. A gene that affects multiple products is regulated by those products. Thus, every input-output relation is regulated by feedback.

For the genetic paradigm, the term promoter or promoter mechanism of a gene is defined as the control mechanisms that regulate homeostasis of its product(s) through expression. Promoter machinery can be formed by multiple molecule complexes. However these component are abstracted away and the key assumption is that homeostasis of expression occurs based on product concentration. This is a fair assumption because genes responsible for physiological processes are closely regulated but details may be poorly understood.

Production Pathway Structure

Figure 24:
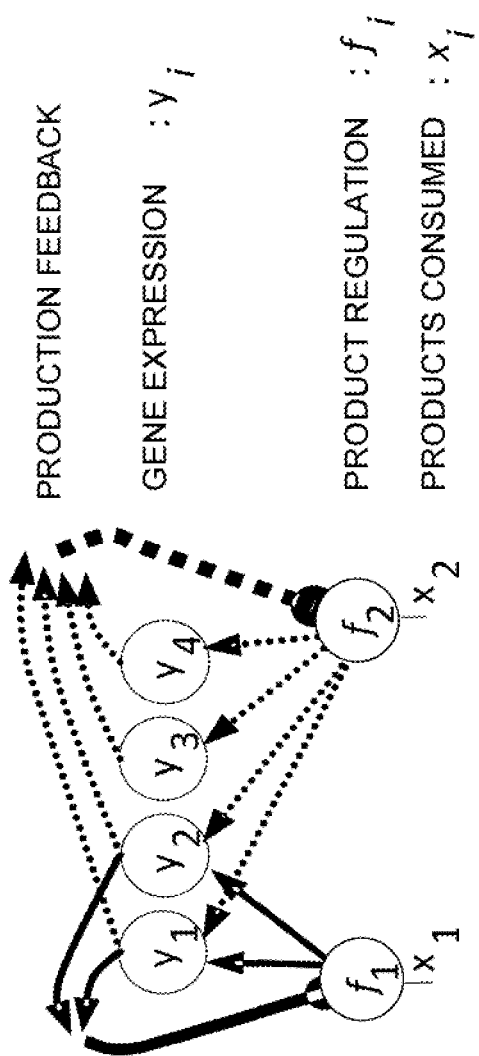
FIG. 24 shows the association between genes and products and promoters.

The proposed tight association between genes and products and promoters is depicted in FIG. 24. FIG. 24 shows self-regulation: if expression of $y_1$ & $y_2$ replace $x_1$ then regulatory element $f_1$ monitors this product and regulates $y_1$ & $y_2$. Similarly if $y_1$, $y_2$, $y_3$ & $y_4$ replenish $x_2$ then $f_2$ monitors replacement of $x_2$ and regulates $y_1$, $y_2$, $y_3$ & $y_4$.

Every product has three values associated with it: x, Y and f. x represents how much product is taken out of the system due to consumption, Y how much of it is produced, and promoter element f, which samples x and Y and accordingly regulates the genes that are involved in the production of the product. The promoter element f modulates gene expression y of genes that produce products associated with f.

The tight association creates a situation where each promoter element monitors the equilibrium (between production and consumption) of its product. Multiple promoter elements (each monitoring a product the gene contributes) determine a gene's expression.

If several genes lead to the production of the same product, no gene will be fully promoted by the amount the product is consumed. For example, if two genes lead to the production the same product, each of the two genes only needs to be expressed at half the amount of a single gene. If one of the genes is to be further promoted than the other, this must be mediated through the gene's other products & promoters. The more products two genes share, the more they will interact with each other's promoters. The less products genes share, the less their promoters will interact, and the more independent these genes will be.

The network dynamically evaluates gene expression by: 1) Determining promoter activity based on product consumption and production concentrations. 2) Modifying gene expression based on the promoter. 3) Re-determining promoter activity based on new concentrations.

Steps 1-3 are continuously cycled through expression, promoters and products.

Borrowing nomenclature from engineering control theory, this type of network is composed of competing (inhibitory) feedback. This type of inhibition results in a 'negative' (in other words stabilizing) feedback system.

Production Model Equations

This section introduces general equations governing this network. They are identical to the recognition model equations. They force the network to evaluate the most efficient configuration of genes for a given product consumption. For any gene y denoted by index a, let $N_a$ denote the set of products that gene $y_a$ affects. Let $n_a$ denote the number of products gene $y_a$ affects. For any product x denoted by index b, let $M_b$ denote all genes that affect $x_b$. The total amount of production of product $x_b$ is $Y_b$. $Y_b$, is the sum of expression from all genes that affect product $x_b$.

$$Y_b = \sum_{j \in M_b} y_j(t) \quad (1)$$

The degree of promotion due to promoter $f_b$ is determined by consumption of $x_b$ and the overall production of $x_b$: $Y_b$. This is determined by:

$$f_b = \frac{x_b}{Y_b} \quad (2)$$

The expression of $y_a$ is dependent on its previous expression and its promoters. The equations are designed so that gene expression is proportional to the amount of product consumed, inversely proportional to the amount of product produced, and also depend on their previous expression levels (Achler, 2002; Achler, 2007).

$$y_a(t+1) = \frac{y_a(t)}{n_a} \sum_{i \in N_a} f_i \quad (3)$$

$$= \frac{y_a(t)}{n_a} \sum_{i \in N_a} \frac{x_i}{Y_i} = \frac{y_a(t)}{n_a} \sum_{i \in N_a} \left( \frac{x_i}{\sum_{j \in M_i} y_j(t)} \right) \quad (4)$$

To demonstrate how this system attempts to replace consumed products through a minimum amount of overall gene expression, several toy configurations of genes are simulated.

The scenarios cover basic configurations that can be combined to generalize to complex configurations: 1) What happens when two genes lead to the same product but one of them also leads to another product. 2) How can multiple genes with overlapping products promote or inhibit each other's expression based on consumption patterns. 3) The behavior of an infinitely large number of genes with overlapping products is analyzed.

Composition by Overlap of Nodes

In the simplest example, example 1 (FIG. 25—examples of compositions), two genes lead to the same product but one of the genes also leads to another product. If genes $y_1$ & $y_2$ replenish product $x_1$, by definition the $x_1$ associated promoter element $f_1$ affects genes $y_1$ & $y_2$. If gene $y_2$ also replenishes product $x_2$, then gene $y_2$ is also regulated by product $x_2$ associated promoter element $f_2$. Thus gene $y_1$ expression is affected by consumption of product $x_1$ and gene $y_2$ is affected by consumption of products $x_1$ & $x_2$. Yet, the expression of gene $y_1$ can indirectly depend on the consumption of product $x_2$, because if products $x_1$ & $x_2$ are consumed equally, then gene $y_2$ will be promoted at the expense of gene $y_2$.

Gene, $y_1$ leads to one product (when expression is 1 then the gene fully expresses only $x_1$), thus affected by one promoter element. Gene $y_2$ leads to two products, thus affected by two promoter elements. Individually each of the promoters can at most promote the gene to express at half its capacity.

Given a consumption pattern, the system is allowed to iteratively express and regulate. The network is evaluated until it settles onto a steady state. The solutions are presented as (products consumed)→(genes expressed). Since there are two products and two genes in example 1, the solution is written in the form $(x_1, x_2)$→$(y_1, y_2)$. The steady state solution for example 1 is: $(x_1, x_2)$→$(y_1=x_1-x_2, y_2=x_2)$.

This is an efficient configuration where no products are wasted. Neither $x_1$ nor $x_2$ are produced if they are not needed. For example, when products $x_1$ & $x_2$ are equally consumed then gene $y_2$ is expressed and gene $y_1$ is silenced. This occurs because a dual consumption of $x_1$ & $x_2$ stimulate promoter elements $f_1$ and $f_2$. However these elements are also sensitive to production of these products $Y_1$ and $Y_2$. If $y_1$ and $y_2$ are concurrently expressed, then $Y_1$ will be twice as large as $Y_2$. $f_1a$ will be more down-regulated (eq 2). From the perspective of the genes, gene $y_1$ has all of its promoter elements reduced when $f_1$ down-regulated, while gene $y_2$ still has an independent promoter $f_2$. Gene $y_2$ expression becomes preferred and in the process inhibits gene $y_1$. The final result is that if product $x_2$ is not consumed, gene $y_2$ is not expressed. Consumption values can have any real value and generate real value expression levels.

Example 2: Different Gene configurations can generate incomplete or variable expression. In these cases genes may not completely dominate. In example 2, gene $y_1$ is replaced by gene $y_3$. Genes $y_2$ and $y_3$ can equally affect product $x_2$, but also affect independent products $x_1$ and $x_3$ respectively. If only product $x_2$ is consumed, or products $x_1$ & $x_3$ are consumed equally, either gene $y_2$ or gene $y_3$ can lead to the needed product $x_2$. However in either case, there will be some extraneous products that are not consumed. Genes that lead to two products can not express only one product. The simulations reflect this imbalance and the solution is more complicated. The mathematical solutions are:

$$(x_1, x_2, x_3) \to \left( y_1 = \frac{x_1(x_1 + x_2 + x_3)}{2(x_1 + x_3)}, y_2 = \frac{x_3(x_1 + x_2 + x_3)}{2(x_1 + x_3)} \right) \quad (6)$$

When consumption is (1,1,1) then expression becomes (¾, ¾). If only $x_2$ is consumed (0,1,0), then the promoter elements of both genes are symmetrical, the equation collapses to $2(y_1+y_2)=x_2$ and the solution depends on initial conditions (also see appendix). Thus either gene can express $x_2$, and there is no efficient way to configure genes expression.

Three genes: In example 3, expanded from examples 1 & 2, three genes share products, and it is shown how genes can interact in a distributed fashion. A third gene $y_3$ is introduced.

The steady state solution limited to positive genes expression values is:

$$(x_1, x_2, x_3) \to (y_1 = x_1 - x_2 + x_3, y_2 = x_2 - x_3, y_3 = x_3) \quad (7)$$

If $x_2 \leq x_3$ then $y_2=0$ and the equations become:

$$\left( x_1, 0, \frac{x_2 + x_3}{2} \right). \quad (8)$$

If $x_3=0$ the solution becomes that of Eq 6:

$$(x_1, x_2, 0) \to (x_1 - x_2, x_2, 0). \quad (9)$$

Similar to example 1, if product $x_1$ is consumed, gene $y_1$ is expressed. If products $x_1$ & $x_2$ are consumed equally, then gene $y_2$ is expressed. The underlying reasons remain the same. However, in this case, genes $y_1$ and $y_3$ can together affect gene $y_2$ so it will not be expressed.

If products $x_1$, $x_2$ & $x_3$ are equally consumed, then genes $y_1$ and $y_3$ are expressed equally (1, 1, 1)→(1, 0, 1). If products $x_1$, $x_2$ & $x_3$ are consumed equally, gene $y_2$ is not expressed. The network as a whole chooses the gene or genes that best most efficiently match the consumption pattern with the least amount of extraneous products.

This case demonstrates that information travels indirectly 'through' the promoters based on gene structures. Given equal consumption of $x_1$ & $x_2$, expression of $y_1$ is determined by consumption of $x_3$ through $y_3$. If $x_3$ is not consumed (its value is 0), then gene $y_1$ is not expressed. If $x_3$ is consumed, $y_1$ becomes active. However, $x_3$ is not directly affected by $y_1$, and the product affected by $y_1$ ($x_1$) is not directly expressed by $y_3$. Thus genes can cooperate and function in groups.

Figure 26:
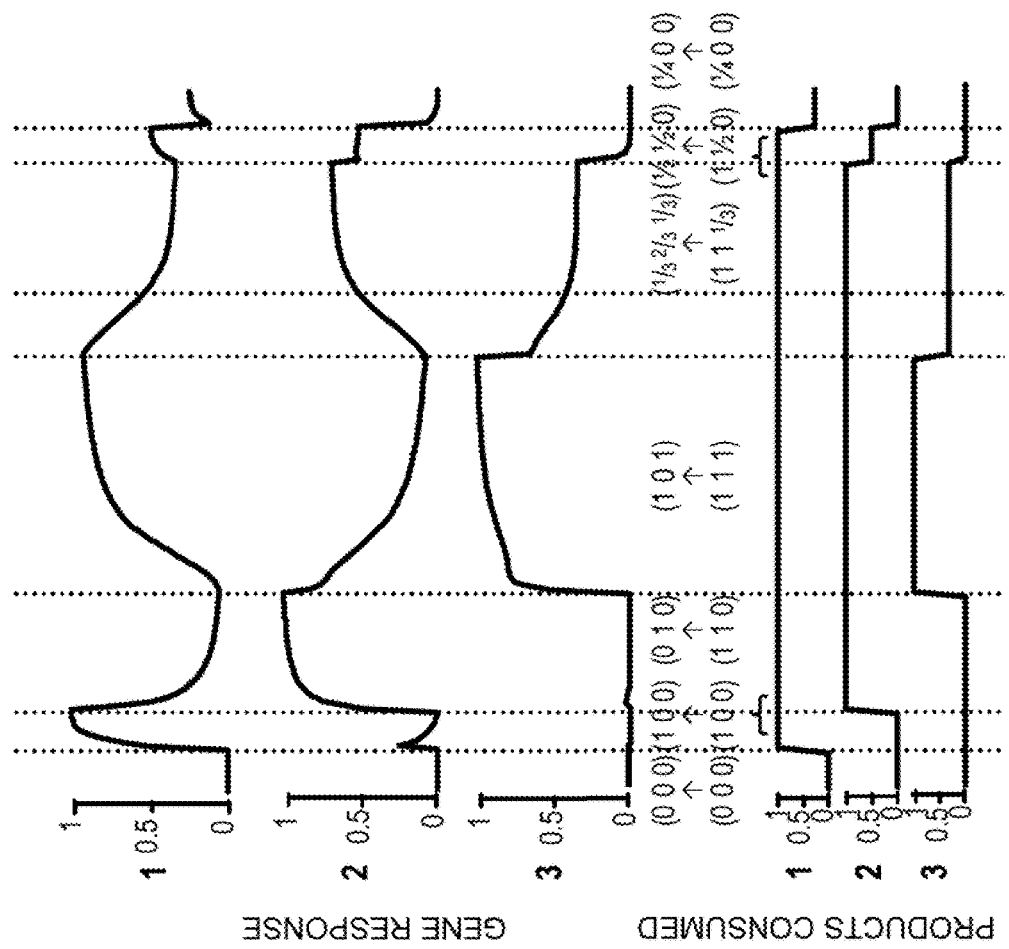
FIG. 26 shows the dynamics of the model and scenario.

FIG. 26 shows the dynamics of the model and scenario. The dynamic nature of the network is illustrated. Product use pattern is changed successively and the gene expression responds accordingly. Product consumption is plotted on the bottom, while the corresponding gene responses are plotted on top. Endpoint values for each epoch are labeled top to bottom: (product levels) up arrow (gene activation). The response of the genes to several product consumption levels is shown. These consumption levels are changed dynamically and the network responds appropriately.

Composition by Infinite Chains

Genes can interact in chains linked at infinitum. Thus, promoters and genes interact indirectly by transferring their dynamic activation through the chain. However no matter how many genes are linked, the genetic system attempts to match the product consumption with the most efficient gene expression configuration.

Chain of Genes Including A 1-Product Gene

Figure 25:
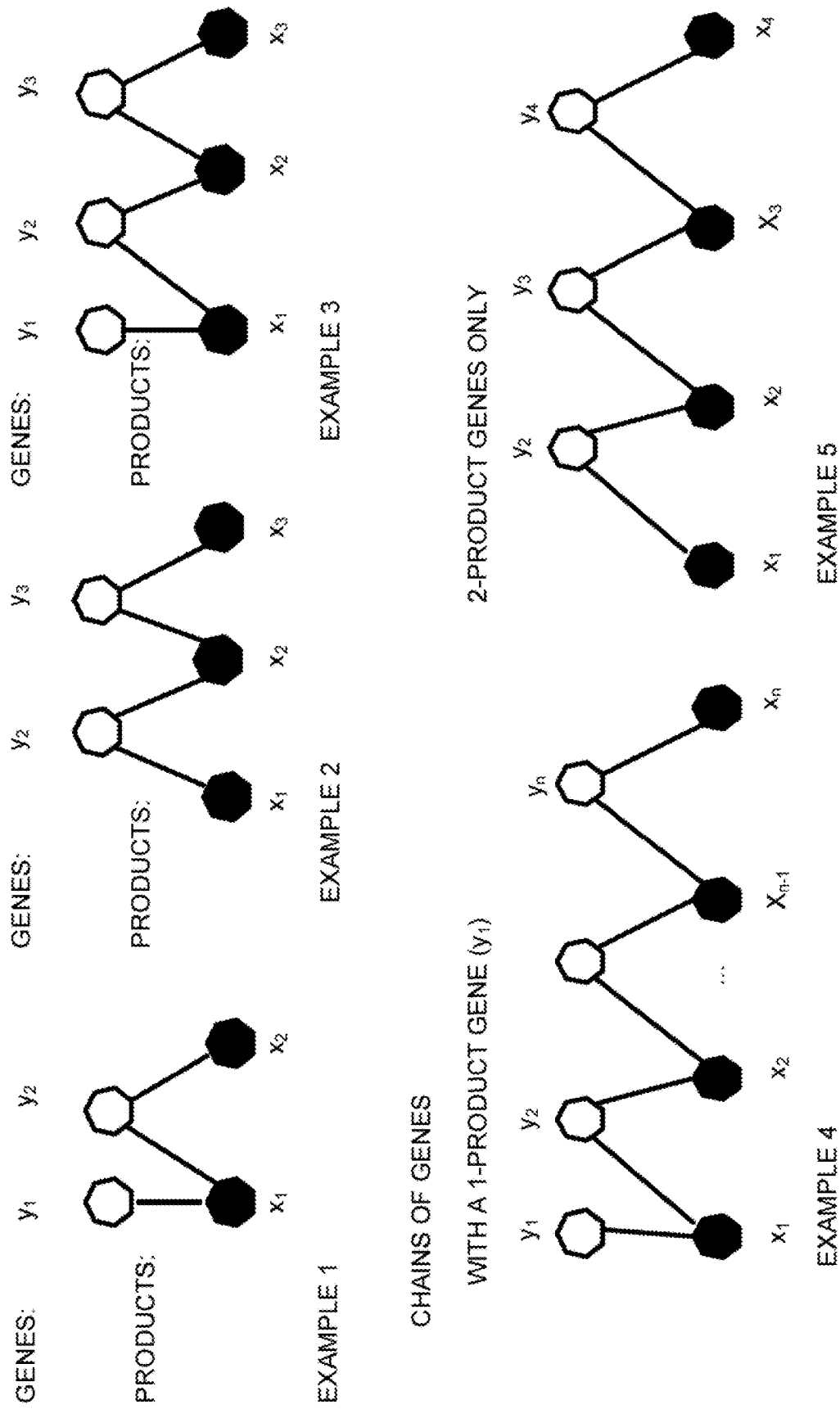
FIG. 25 shows examples of compositions.

Consider the case where there are N two-product genes that are connected in a chain shown in FIG. 25, example 4. This configuration includes a 1-product gene similar to examples 1 & 3. Suppose all products are consumed equally, for example all have the value 1. The network will find the most efficient configuration of expression where no extraneous products are created. This configurations may change based on the properties of the links. For example suppose there are N gene links. If N is an odd number then gene $y_1$ will express its single product and every second gene will be express their products. The genes interspersed in between will be turned off (0). If N is even, $y_1$ will be turned off and the ever genes will be expressed (1) and odd ones turned off. IF i & j represent gene indexes the general solution becomes:

$$(x_1, x_i, \ldots, x_N) \to \left( \sum_{i \leq j \leq N} (-1)^j x_j, \ldots, x_N \right)$$

For example with four genes chained, N=4: (1,1,1,1)→(0,1,0,1).

With 5 genes chained N=5: (1,1,1,1,1)→(1,0,1,0,1). If the concentrations of x are such that y<0, the chain breaks at that gene and the rest of the links behave as smaller independent chains from that point (see sub-chains section).

Without a 1-Product Gene

If a one product gene is not available, then the network does not have a favorable set of genes to resolve an odd number of product consumption. Two-product genes can not produce an odd number of products.

Thus, in these cases the solution becomes more complicated. In the case of three products was previously presented. In case of 4 inputs distributed over 3 genes the solution becomes:

$$\left(\frac{x_1(\Sigma X)}{2(x_1+x_3)}, \frac{-(\Sigma X)(x_1 x_4 - x_3 x_2)}{2(x_1+x_3)(x_2+x_4)}, \frac{x_4(\Sigma X)}{2(x_2+x_4)}\right)$$

Where $\Sigma X = x_1 + x_2 + x_3 + x_4$.

When all products are consumed (x's are 1), the cells settle on a binary solution (1,0,1). Thus simple solutions can be found as long as there is an even number of products consumed. Cases with N>4 genes become progressively more complicated to solve thus are beyond the scope of this paper.

Subchains

If a product in the chain is not consumed, this can break the chain into independent components composed of the right and left parts of the chain from the unconsumed product. These chains can function as smaller chains. For example if product $x_6=0$, the chains involving genes $y_{1-6}$ and $y_{6-N}$ become independent. Thus gene expression patterns are determined by distributed product-promoter dynamics involving consumption and gene structures.

This theory shows that highly regulated genes can affect one another and form a system-wide homeostasis. Within the given demonstrations, the system configures the expression of multiple genes to efficiently minimize extraneous products.

This model suggests future experiments and methods to control gene expression by artificially introducing products. Existing data on promoter and expression region can be used to predict which genes may compete. It also suggests that introducing artificial products which match a gene's regulation pattern may change its expression in favor other native genes which share the same production pathway. Alternatively, if a gene has been artificially inserted but its products are not sufficiently expressed, it may be possible inhibit native genes. This can be achieved by introducing protein products to match product patterns of the native genes. Also, since promoters are distributed across genes, this system reveals how copied genes can integrate into the genome while still being closely regulated.

From a regulation perspective, the final goal is to create a regulatory system that can operate within complex networks to determine most efficient production configurations but be simple to incorporate new production units.

From a recognition perspective the final goal is to create an active and behaving recognition system model. Through feedback should form a cognitive system that can both recognize and be directed to recognize and locate objects. For example biasing food would propagate activity to all objects associated with food priming them and priming the visual system. This primes spatial and search mechanisms and initiates a searching behavior for anything associated with food. When misleading cues and objects are selected, it negatively primes the activation of the object that caused it, changing the behavior of the recognition system and search behavior.

FIG. 28(A-C) shows modular nodes $y_1$ and $y_2$ (A & B respectively) can be simply combined to form a combined network (C). Since f & Y are symmetric, the network can be drawn using bidirectional connections.

REFERENCES

Achler, T. (2002). "Input Shunt Networks." *Neurocomputing* 44: 249-255.

Achler, T. (2007). "Object classification with recurrent feedback neural networks." *Proc. SPIE Evolutionary and Bio-inspired Computation: Theory and Applications* 6563.

Achler, T. and E. Amir (2008). "Input Feedback Networks: Classification and Inference Based on Network Structure." *Artificial General Intelligence* 1: 15-26.

Achler, T. and E. Amir (2008b). "Hybrid Classification and Symbolic-Like Manipulation Using Self-Regulatory Feedback Networks." *Proceedings of the Fourth International Workshop on Neural-Symbolic Learning and Reasoning*.

Achler, T., C. Omar, et al. (2008). "Shedding Weights: More With Less." *Proceedings of the 2008 IEEE International Joint Conference on Neural Networks* (IJCNN '08).

Albert, R., H. Jeong, et al. (2000). "Error and attack tolerance of complex networks." *Nature* 406(6794): 378-82.

Bichot, N. P., A. F. Rossi, et al. (2005). "Parallel and serial neural mechanisms for visual search in macaque area V4." *Science* 308(5721): 529-34.

Carpenter, G. A. and S. Grossberg (1987). "A Massively Parallel Architecture for a Self-Organizing Neural Pattern-Recognition Machine." *Computer Vision Graphics and Image Processing* 37(1): 54-115.

Chelazzi, L., J. Duncan, et al. (1998). "Responses of neurons in inferior temporal cortex during memory-guided visual search." *J Neurophysiol* 80(6): 2918-40.

Cudmore, R. H. and G. G. Turrigiano (2004). "Long-term potentiation of intrinsic excitability in LV visual cortical neurons." *J Neurophysiol* 92(1): 341-8.

Desimone, R. and J. Duncan (1995). "Neural mechanisms of selective visual attention." *Annu Rev Neurosci* 18: 193-222.

Duncan, J. and G. W. Humphreys (1989). "Visual-Search and Stimulus Similarity." *Psychological Review* 96(3): 433-458.

Froemke, R. C., I. A. Tsay, et al. (2006). "Contribution of individual spikes in burst-induced long-term synaptic modification." *J Neurophysiol* 95(3): 1620-9.

Grill-Spector, K., R. Henson, et al. (2006). "Repetition and the brain: neural models of stimulus-specific effects." *Trends Cogn Sci* 10(1): 14-23.

Kauffman, S., C. Peterson, et al. (2003). "Random Boolean network models and the yeast transcriptional network." *Proc Natl Acad Sci USA* 100(25): 14796-9.

Luck, S. J., L. Chelazzi, et al. (1997). "Neural mechanisms of spatial selective attention in areas V1, V2, and V4 of macaque visual cortex." *J Neurophysiol* 77(1): 24-42.

Maunsell, J. H. and S. Treue (2006). "Feature-based attention in visual cortex." *Trends Neurosci* 29(6): 317-22.

Milo, R., S. Shen-Orr, et al. (2002). "Network motifs: simple building blocks of complex networks." *Science* 298 (5594): 824-7.

Nochomovitz, Y. D. and H. Li (2006). "Highly designable phenotypes and mutational buffers emerge from a systematic mapping between network topology and dynamic output." *Proc Natl Acad Sci USA* 103(11): 4180-5.

Nykter, M., N. D. Price, et al. (2008). "Critical networks exhibit maximal information diversity in structure-dynamics relationships." *Phys Rev Lett* 100(5): 058702.

Rao, A. R., G. A. Cecchi, et al. (2008). "Unsupervised segmentation with dynamical units." *IEEE Trans Neural Netw* 19(1): 168-82.

Reynolds, J. H. and R. Desimone (1999). "The role of neural mechanisms of attention in solving the binding problem." *Neuron* 24(1): 19-29.

Shmulevich, I., H. Lahdesmaki, et al. (2003). "The role of certain Post classes in Boolean network models of genetic networks." *Proc Natl Acad Sci USA* 100(19): 10734-9.

Spratling, M. W. and M. H. Johnson (2004). "A feedback model of visual attention." *Journal of Cognitive Neuroscience* 16(2): 219-237.

Treisman, A. and S. Gormican (1988). "Feature Analysis in Early Vision—Evidence from Search Asymmetries." *Psychological Review* 95(1): 15-48.

Treue, S. and J. C. Martinez-Trujillo (1999). "Feature-based attention influences motion processing gain in macaque visual cortex." *Nature* 399(6736): 575-9.

Usher, M. and E. Niebur (1996). "Modeling the temporal dynamics of IT neurons in visual search: A mechanism for top-down selective attention." *Journal of Cognitive Neuroscience* 8(4): 311-327.

von der Malsburg, C. (1999). "The what and why of binding: the modeler's perspective." *Neuron* 24(1): 95-104, 111-25.

Wolfe, J. M. (2001). "Asymmetries in visual search: An introduction." *Perception & Psychophysics* 63(3): 381-389.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

The invention claimed is:

1. A computer-implemented method comprising:
    obtaining an input;
    selecting one or more portions of the inputs to derive features in each selected portion;
    classifying each of the features using a trained neural network that includes a set of input nodes and a first set of output nodes as part of a first hierarchical layer of the trained neural network, wherein each of the set of input nodes represents any feature, and wherein each input node feeds to one or more of the first set of output nodes, wherein the classifying further includes:
        deriving, by each of the first set of output nodes during each of a number of recognition iterations, a representation from each feature provided by the one or more input nodes connected to each of the first set of output nodes and a set of feedback, wherein each input node has a first state at a first recognition iteration, and wherein a weight for each of the first set of output nodes is assigned based on a number of input nodes connected to each of the first set of output nodes;
        providing, by each of the first set of output nodes during each of the number of recognition iterations, the set of feedback derived by each of the first set of output nodes to the one or more input nodes connected to each of the first set of output nodes;
        updating, at each of the number of recognition iterations, the first state of each input node to an updated state at each recognition iteration based on the set of feedback from each corresponding output node of the first set of output nodes, wherein modification of the input nodes are inhibited by the set of feedback, wherein the number of recognition iterations are based on the updated states of each input node updated based on the set of feedback from each corresponding output node of the first set of output nodes;
    identifying one or more patterns in the output from the first set of output nodes after the number of recognition iterations; and
    causing a display of the one or more patterns identified in the output.

2. The method of claim 1, wherein each of said one or more output nodes represents a labeled representation that includes at least one of the features, said neural network trained with a training set having one or more labeled training samples, and wherein each of said one or more output nodes is associated with at least one of said one or more labeled training samples.

3. The method of claim 1, wherein, in each of said one or more iterations, all of said output nodes feedback to all their associated input nodes at a same time.

4. The method of claim 1, wherein the feedback from each output node to said associated set of input nodes inhibits the input nodes using subtractive inhibition or shunting inhibition.

5. The method of claim 4, wherein activation from an inhibited input is projected to a corresponding output, completing an iteration and preparing for a subsequent iteration.

6. The computer-implemented method of claim 1, further comprising:
    determining if the number of recognition iterations exceeds a predefined threshold number; and, responsive to determining that the number of recognition iterations exceeds the predefined threshold number, changing an attention window to acquire sensor inputs providing the input.

7. The computer-implemented method of claim 1, further comprising:
    determining whether feedback from an output node to an associated input node does not satisfy a matching criteria after a predefined number of iterations; and
    responsive to determining that feedback from the output node to the associated input node does not satisfy the matching criteria, changing an attention window to acquire sensor inputs providing the spatial input.

8. The computer-implemented method of claim 1, further comprising:
    determining whether the number of recognition iterations exceeds a predefined threshold number; and,
    based on determining that number of recognition iterations exceeds the predefined threshold number, performing at least one of: adding nodes, modifying weights, modifying a hierarchy of nodes, and modifying connections.

9. The computer-implemented method of claim 1, further comprising:
    determining whether feedback from an output node to an associated input node does not satisfy a matching criteria after a predefined number of iterations; and, based on determining that the feedback from the output node to the associated input node does not satisfy the matching criteria, performing at least one of: adding nodes, modifying weights, and modifying connections.

10. The computer-implemented method of claim 1, wherein the trained neural network comprises a hierarchy of layers, each layer in the hierarchy of layers comprising one or more of said input nodes and one or more of said output nodes, wherein output nodes of a given layer function as input nodes of a layer that is higher than said given layer in said hierarchy of layers; and wherein said neural network comprises bidirectional connections between each output node and one or more input nodes of each layer, and wherein feedback from one or more input nodes of a first layer acts as a bias to one or more output nodes of a second layer that is lower than the first layer.

11. The computer-implemented method of claim 10, wherein output nodes of a given layer function as input nodes of a layer that is immediately higher than said given layer, and wherein, feedback from input nodes of a first layer acts as a bias to the output nodes of a second layer that is immediately lower than said first layer.

12. The computer-implemented method of claim 10, wherein the feedback from said one or more input nodes of the first layer also biases at least one lower layer other than a lower layer that is immediately lower than the first layer.

13. The computer-implemented method of claim 10, wherein the feedback from the one or more output nodes of the first layer is employed to generate patterns previously learned.

14. The computer-implemented method of claim 13, further comprising
further analyzing at least one of the patterns generated using the feedback to discover characteristics pertaining to at least one of the patterns.

15. The computer-implemented method of claim 13 wherein output nodes of another layer also function as input nodes of another layer that is immediately higher than the given layer, the another layer also being lower than the given layer in the hierarchy of layers.

16. The computer-implemented method of claim 10 further comprising:
biasing an output node to reveal a strength of connectivity to input nodes associated with the output node.

\* \* \* \* \*